(12) United States Patent
Dande et al.

(10) Patent No.: US 12,013,970 B2
(45) Date of Patent: Jun. 18, 2024

(54) SYSTEM AND METHOD FOR DETECTING AND OBFUSCATING CONFIDENTIAL INFORMATION IN TASK LOGS

(71) Applicant: Bank of America Corporation, Charlotte, NC (US)

(72) Inventors: Pratap Dande, Saint Johns, FL (US); Akhila Mylaram, Frisco, TX (US); Gilberto R. Dos Santos, Jacksonville, FL (US); JayaBalaji Murugan, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 17/744,930

(22) Filed: May 16, 2022

(65) Prior Publication Data
US 2023/0367903 A1 Nov. 16, 2023

(51) Int. Cl.
*G06F 21/62* (2013.01)
*G06F 16/31* (2019.01)

(52) U.S. Cl.
CPC .......... *G06F 21/6254* (2013.01); *G06F 16/31* (2019.01)

(58) Field of Classification Search
CPC .. G06F 21/6254; G06F 16/31; G06F 21/6218; G06F 2211/007; G06F 2211/008; G06F 2212/402; G06F 21/6209; H04L 63/105; H04L 9/00; H04L 2209/04; H04L 2209/16
USPC ............. 726/26, 27; 713/189, 193, 171, 165
See application file for complete search history.

(56) References Cited

U.S. PATENT DOCUMENTS

| | | | |
|---|---|---|---|
| 7,039,816 B2 | 5/2006 | Kocher et al. | |
| 7,353,499 B2 | 4/2008 | De Jong | |
| 7,363,620 B2 | 4/2008 | De Jong | |
| 7,415,618 B2 | 8/2008 | De Jong | |
| 7,529,946 B2 | 5/2009 | Ray et al. | |
| 7,920,702 B2 | 4/2011 | Shen-Orr et al. | |
| 7,941,862 B2 | 5/2011 | Ma et al. | |
| 8,023,653 B2 | 9/2011 | Doherty et al. | |
| 8,127,149 B1 * | 2/2012 | Nachenberg | G06F 21/6218 713/193 |
| 8,151,110 B2 | 4/2012 | Vantalon et al. | |
| 8,220,058 B2 | 7/2012 | De Jong | |
| 8,296,240 B2 | 10/2012 | Read | |
| 8,347,114 B2 | 1/2013 | Gremaud et al. | |
| 8,347,398 B1 | 1/2013 | Weber | |
| 8,392,723 B2 | 3/2013 | Suzuki | |
| 8,452,986 B2 | 5/2013 | Luetzelberger et al. | |
| 8,489,898 B2 | 7/2013 | Wong | |
| 8,549,656 B2 | 10/2013 | Blaisdell et al. | |
| 8,769,305 B2 | 7/2014 | Blaisdell | |

(Continued)

*Primary Examiner* — Kaylee J Huang

(57) ABSTRACT

A system accesses a task log comprising text that is confidential information. The system selects a first portion of the task log. The system compares each word in the first portion with keywords that are known to be confidential information. The system determines that a word in the first portion is among the keywords. The system determines a hierarchical relationship between the word and neighboring words. The system determines that the word is associated with the neighboring words based on the hierarchical relationship. The system generates a template pattern comprising the word and one or more words associated with the word. The system obfuscates the template pattern.

20 Claims, 7 Drawing Sheets

(56) References Cited

U.S. PATENT DOCUMENTS

| | | | |
|---|---|---|---|
| 8,782,805 B2 * | 7/2014 | Zhang | G06F 16/313 726/30 |
| 8,811,612 B2 | 8/2014 | Gerraty | |
| 8,850,216 B1 | 9/2014 | Mikhailov et al. | |
| 8,984,272 B2 | 3/2015 | Kohiyama et al. | |
| 9,124,560 B1 | 9/2015 | Vemula et al. | |
| 9,135,418 B2 | 9/2015 | Wade et al. | |
| 9,178,856 B2 | 11/2015 | Castro et al. | |
| 9,396,325 B2 | 7/2016 | Kendall | |
| 9,430,406 B2 | 8/2016 | Van Der Sluis et al. | |
| 9,432,184 B2 | 8/2016 | Zheng et al. | |
| 9,473,485 B2 | 10/2016 | Kendall | |
| 9,698,973 B2 | 7/2017 | Johnson et al. | |
| 10,164,980 B1 | 12/2018 | Berfeld et al. | |
| 10,178,078 B1 | 1/2019 | Boyer et al. | |
| 10,187,200 B1 | 1/2019 | Firestone et al. | |
| 10,292,049 B2 | 5/2019 | Doumen | |
| 10,454,671 B2 | 10/2019 | Thorwirth et al. | |
| 10,552,588 B2 | 2/2020 | Doumen | |
| 10,652,015 B2 | 5/2020 | Le Saint et al. | |
| 10,824,737 B1 | 11/2020 | Guyomarc'H et al. | |
| 11,228,427 B2 | 1/2022 | Nair et al. | |
| 2010/0095132 A1 | 4/2010 | Murray | |
| 2012/0042170 A1 | 2/2012 | Curtin et al. | |
| 2012/0079281 A1 | 3/2012 | Lowenstein et al. | |
| 2012/0191983 A1 | 7/2012 | Simske et al. | |
| 2014/0047557 A1 | 2/2014 | Veerubhotla et al. | |
| 2014/0053252 A1 | 2/2014 | Kelsey | |
| 2014/0108818 A1 | 4/2014 | Choi et al. | |
| 2015/0074398 A1 | 3/2015 | Cullen et al. | |
| 2015/0270951 A1 | 9/2015 | Michiels et al. | |
| 2016/0021109 A1 | 1/2016 | Jueneman et al. | |
| 2016/0239231 A1 * | 8/2016 | Yoshida | G06F 11/20 |
| 2016/0366116 A1 | 12/2016 | Swaminathan et al. | |
| 2017/0149793 A1 * | 5/2017 | Spertus | G06F 21/6245 |
| 2017/0353745 A1 | 12/2017 | Krkkinen et al. | |

* cited by examiner

SYSTEM AND METHOD FOR DETECTING AND OBFUSCATING CONFIDENTIAL INFORMATION IN TASK LOGS

TECHNICAL FIELD

The present disclosure relates generally to cryptography and security, and more specifically to a system and method for detecting and obfuscating confidential information in task logs.

BACKGROUND

Users or clients of an organization access software or a web application provided by the organization to access services and/or products provided on the application. When the users interact with the application, multiple tasks may be performed behind the scene on the backend to allow the user to interact with the application. For example, when a user opens a webpage on the application, code may be triggered to load the webpage. When the tasks are executed, task logs that include events associated with implementing the application are generated. In some cases, the application may fail due to an error or a bug in the code. For example, when a user clicks on a link on the application to open a webpage, the webpage fails to load. The task logs are large in size. It is challenging to process the task logs efficiently. In some cases, the task logs include confidential information. In troubleshooting the task logs, confidential information may be exposed. It is also challenging to identify confidential information.

SUMMARY

The system described in the present disclosure is particularly integrated into 1) a practical application for improving the memory resource utilization associated with network nodes executing multiple tasks in a distributed computing network; 2) a practical application for detecting and obfuscating confidential information in task logs; and 3) a practical application for detecting anomalies in blockchain transactions and updating a distributed blockchain ledger based on the detected anomalies.

These practical applications provide several technical advantages, including improving the underlying operations of the network nodes executing multiple tasks, improving the task execution process by improving the efficiency in memory resource usage, improving information security technology by obfuscating confidential information in task logs, and improving tracking the performance of blockchain transactions by detecting anomalies in blockchain transactions and initiating an investigation of the detected anomalies. These practical applications are described below.

Determining Memory Resource Configuration for Network Nodes to Operate in a Distributed Computing Environment The present disclosure contemplates systems and methods for determining memory resource configuration for network nodes to operate in a distributed computing environment. In an example scenario, assume that an organization provides services and/or products to its users. For example, the organization may provide services and/or products via a software, mobile, and/or web application (collectively referred to herein as an application). Users or clients of the organization may use the application to request services and/or products. The application may have a graphical user interface (e.g., a webpage) that the users can interact with the application. When the users interact with the application and/or when the application is executed and running, multiple tasks may be performed. The tasks may include executing the code used to implement the application, such as when a user opens a webpage on the application, a task to load the webpage may be executed. The tasks may be processed using network nodes in a distributed computing network.

In the distributed computing network, the network nodes are configured to use a particular memory resource configuration. One approach to configure the network nodes is to configure their memory resources using a default memory resource configuration. In the default memory resource configuration, default values of amounts of memory resources are assigned or allocated to different memory categories in each network node. The memory categories may include data size, disk Input/Output (I/O), random access memory (RAM), Cache, and java virtual memory (JVM). However, this approach suffers from several drawbacks. For example, the default memory resource configuration may not be an optimal configuration to run every task. Some tasks may need more memory resources, while other tasks may need fewer memory resources.

The disclosed system is configured to determine a more optimal memory resource configuration for each network node to execute the tasks. The disclosed system determines the memory resource utilization associated with each network node executing the tasks. The disclosed system determines whether the memory resource utilization is optimized. For example, the disclosed system determines that the memory resource utilization is not optimal because it is less than a threshold memory resource utilization. If the disclosed system determines that the memory resource utilization is not optimized, the disclosed system determines a more optimal memory resource configuration to be implemented on the network nodes. The determined optimal memory resource configuration results in a more optimal memory resource utilization and a more optimal memory resource allocation among the memory categories. The disclosed system configures the network nodes according to the determined optimal memory resource configuration. The newly configured network nodes may execute the tasks.

Accordingly, the disclosed system is integrated into a practical application of improving the memory resource utilization for network nodes executing the tasks. Furthermore, the disclosed system is integrated into an additional practical application for improving task execution. For example, as a result of improving the memory resource utilization of network nodes, a task may be executed in less time because the memory resources are allocated more efficiently among the memory categories. Furthermore, the disclosed system is integrated into an additional practical application of improving the underlying operations of network nodes that are tasked with executing the tasks.

In one embodiment, a system for determining a memory resource configuration of network nodes for executing tasks in a distributed environment comprises a memory and a processor. The memory is configured to store a plurality of historical tasks that are executed by a set of network nodes in a distributed environment, where a default memory resource configuration is used for each of the set of network nodes. The processor is operably coupled with the memory. The processor is configured to access the plurality of historical tasks. The processor determines historical memory resources used to execute each of the plurality of historical tasks, where the historical memory resources are associated with a set of memory categories used for various operations. The processor determines the total historical memory resources allocated for each of the set of memory categories. The processor determines that a memory resource utilization in executing at least one task from among the plurality of historical tasks is less than a threshold memory resource utilization. In response to determining that the memory resource utilization in executing the at least one task is less than the threshold memory resource utilization, the processor determines, based at least in part upon the historical memory resources and the total historical memory resources, a memory resource configuration to be used for configuring each of the set of network nodes, such that the determined memory resource configuration yields the memory resource utilization more than the threshold memory resource utilization. The processor configures each of the set of network nodes according to the determined memory resource configuration.

Detecting and Obfuscating Confidential Information in Task Logs

The present disclosure further contemplates systems and methods for detecting and obfuscating confidential information in task logs. The output of executing the tasks (described above) results in task logs. The task logs include records of events associated with the operations of an application (e.g., a web application) and operations performed on the application by users accessing the application. The disclosed system maintains the task logs for troubleshooting, archiving, and other purposes. In some cases, the application may fail, e.g., due to an error or a bug in the code that is used to implement and develop the application. For example, the application may fail and a webpage, a user interface page, or a menu on the application may not load. In such cases, a respective task log may include the event that led to the failure of the application and operations that happened at the failure time.

In certain embodiments, the organization may communicate the task logs to a third-party vendor for debugging, troubleshooting, and determining the cause of the failure. In some cases, the task logs may include confidential information. The confidential information may include private user information, such as social security number, name, address, card number, and proprietary information, such as hostname, port number, database name, network node name, communication protocol, etc., related to network nodes that executed the task. The third-party vendor does not have the authority to access the confidential information. Thus, the disclosed system may be configured to detect and obfuscate the confidential information in the task logs before sending the task logs to the third-party vendor.

Accordingly, the disclosed system is integrated into a practical application of securing the confidential information from unauthorized access. For example, by obfuscating the confidential information, it is kept safe from bad actors, unauthorized vendors, and cyberattacks from gaining unauthorized access to the confidential information. Therefore, the disclosed system provides a technical advantage for improving the information security technology.

In one embodiment, a system for obfuscating confidential information in task logs comprises a memory and a processor. The memory is configured to store a plurality of task logs comprising text that is confidential information, where the confidential information comprises at least one of a port number, a database name, and a server name. The memory is further configured to store a training dataset comprising a set of keywords that are known to be among the confidential information. The processor is operably coupled with the memory. The processor accesses the plurality of task logs. For a first task log from among the plurality of task logs, the processor selects a first portion of the first task log, where the first portion of the first task log comprises a text line or a paragraph. For a first word in the first portion, the processor compares the first word with each of the set of keywords, where comparing the first word with each of the set of keywords comprises: extracting a first set of features from the first word, where the first set of features indicates a first identity of the first word, where the first set of features is represented by a first vector of numerical values, extracting a second set of features from a second word of the set of keywords, where the second set of features indicates a second identity of the second word, where the second set of features is represented by a second vector of numerical values, and comparing the first vector with the second vector. The processor determines that the first word is among the set of keywords, where determining that the first word is among the set of keywords comprises: determining a percentage of numerical values in the first vector that correspond to counterpart numerical values in the second vector, comparing the determined percentage of numerical values in the first vector that correspond to counterpart numerical values in the second vector to a threshold percentage, and determining that the determined percentage of numerical values exceeds the threshold percentage. The processor determines a hierarchical relationship between the first word and neighboring words in the first portion, where the hierarchical relationship between the first word and the neighboring words indicates whether or not the first word is associated with each of the neighboring words. The processor determines that the hierarchical relationship between the first word and the neighboring words indicates that the first word is associated with at least a third word in the first portion. The processor generates a template pattern comprising the first word and the at least third word, where the template pattern indicates that the first word and the at least third word are among the confidential information. The processor obfuscates the first word and the at least third word.

Updating a Blockchain Ledger Based on Detected Anomalies in Blockchain Transactions The present disclosure further contemplates systems and methods for updating a blockchain ledger based on detected anomalies in blockchain transactions. The operations for configuring network nodes to process the tasks and generate task logs, and detecting confidential information in the task logs (described above) may be stored as blockchain transactions in a blockchain network. The disclosed system tracks the progress of each blockchain transaction. The disclosed system evaluates each blockchain transaction and determines whether it is associated with an anomaly. For example, anomalies may include 1) the memory resource configuration (determined for the network nodes) does not lead to a more optimized memory utilization that is more than the threshold memory resource utilization, 2) a machine learning module prediction of confidential information is not accurate (e.g., when training the machine learning module with the training dataset and determining that the machine learning module has not predicted confidential information 180 correctly in historical task logs in which the confidential information is labeled), 3) the machine learning module has predicated that a task log does not include any confidential information (where the task log is known to include confidential information), 4) a task log has not been evaluated or skipped due to an error, and/or other anomalies. If the disclosed system detects an anomaly in a blockchain transaction, the blockchain transaction is rejected. If the disclosed system determines that the blockchain transaction is not associated with an anomaly, a blockchain ledger is updated to reflect that the blockchain transaction is not associated with an anomaly.

Accordingly, the disclosed system is integrated into a practical application of improving the underlying operations of 1) configuring the network nodes with the optimal memory resource configuration, 2) training a machine learning module for detecting confidential information in task logs, and 3) obfuscating the confidential information. For example, if any of these operations are not performed as expected, an anomaly is detected in the blockchain transaction. The disclosed system may use the detected anomaly to trigger an investigation of the blockchain transaction by authorities. Furthermore, the disclosed system is integrated into an additional practical application of detecting anomalies in blockchain transactions and updating the blockchain ledger based on the detection. Thus, the blockchain transaction with an anomaly is escalated and addressed, and not remained undetected.

In one embodiment, a system for updating a blockchain ledger based on detected anomalies in blockchain transactions comprises a memory and a processor. The memory is configured to store a task log comprising confidential information, where the confidential information comprises at least one of a port number, a database name, and a server name. The processor is operably coupled with the memory. The processor accesses a blockchain network comprising a plurality of blocks, where each of the plurality of blocks is a network node. The processor conducts a first blockchain transaction on the task log in the blockchain network, where the first blockchain transaction is associated with obfuscating the confidential information. The processor stores the first blockchain transaction in a first blockchain ledger. The processor determines whether the first blockchain transaction is associated with an anomaly, where the anomaly indicates that a result of the first blockchain transaction is unexpected. In response to determining that the first blockchain transaction is associated with the anomaly, the processor removes the first blockchain transaction from the first blockchain ledger. In response to determining that the first blockchain transaction is not associated with the anomaly, the processor updates the first blockchain ledger by indicating that the first blockchain transaction is not associated with the anomaly.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for determining a more optimal memory resource configuration for network nodes to execute tasks, obfuscate confidential information in task logs, and detect anomalies in blockchain transactions. Embodiments of the present disclosure and its advantages may be understood by referring to FIGS. 1 through 7. FIGS. 1 through 7 are used to describe a system and method for determining memory resource configuration for network nodes to operate in a distributed computing environment, a system and method for detecting and obfuscating confidential information in task logs, and a system and method for detecting anomalies in blockchain transactions and updating a distributed blockchain ledger based on the detected anomalies.

System Overview

Figure 1:
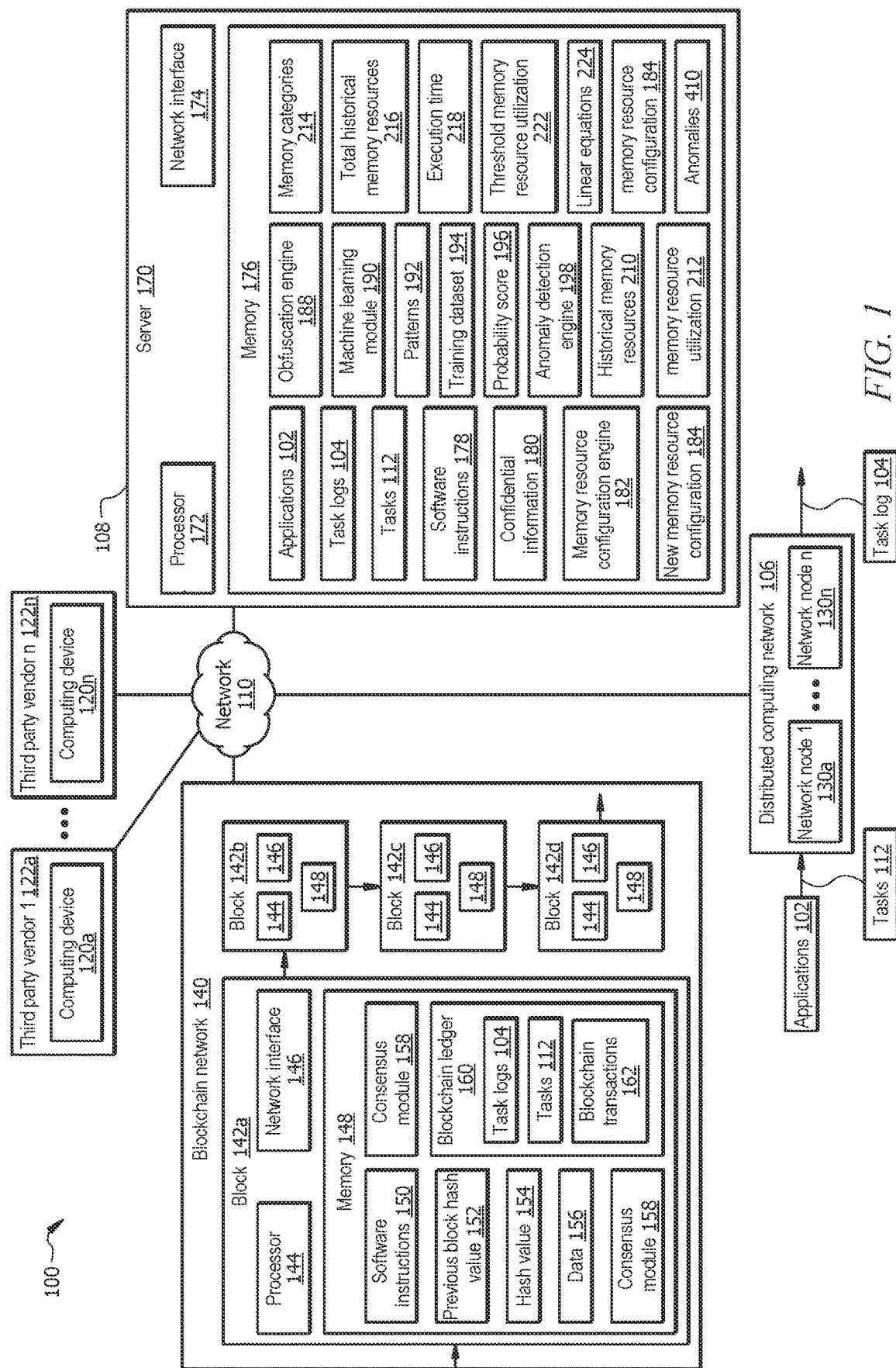
FIG. 1 illustrates an embodiment of a system configured to determine a more optimal memory resource configuration for network nodes to execute tasks, obfuscate confidential information in task logs, and detect anomalies in blockchain transactions.

FIG. 1 illustrates an embodiment of a system 100 that is generally configured to 1) determine a more optimal memory resource configuration 184 for network nodes 130 to operate in a distributed computing network 106, 2) detect and obfuscate confidential information 180 in task logs 104, and 3) update a distributed ledger 160 of a blockchain network 140 based on detecting anomalies 410 in blockchain transactions 162. In one embodiment, system 100 comprises a server 170 communicatively coupled with one or more computing devices 120 (e.g., computing devices 120a and 120n) associated with respective third-party vendors 122 (e.g., vendors 122a and 122n), one or more network nodes 130 (e.g., network nodes 130a and 130n), and a blockchain network 140 via a network 110. Network 110 enables communication among the components of the system 100. Each third-party vendor 122 may be an organization that provides a service and/or a product to its users. Each network node 130 may be a computing device or node in a distributed computing network 106. Blockchain network 140 may include blocks 142 (e.g., blocks 142a-d). Each block 142 may store a record of distributed ledger 160 that is distributed among the blocks 142. The server 170 comprises a processor 172 in signal communication with a memory 176. Memory 176 stores software instructions 178 that when executed by the processor 172, cause the processor 172 to perform one or more operations described herein.

The organization 108 may provide services and/or products to its users. For example, the organization 108 may provide services and/or products via a software, mobile, and/or a web application, collectively referred to herein as an application 102. Users or clients of the organization 108 may use the application 102 to request services and/or products. The server 170 implements the application 102 by the processor 172 executing the software instructions 178. The application 102 may have a graphical user interface (e.g., a webpage) that allows the users to interact with the application 102.

When the users interact with the application 102 and/or when the application 102 is executed and running, multiple tasks 112 may be performed. The tasks 112 may include executing the code used to implement the application 102, such as when a user opens a webpage on the application 102, a task 112 to load the webpage may be executed. The tasks 112 may be processed using the network nodes 130 in a distributed computing network 106. For example, a task 112 may be allocated to several network nodes 130 to be processed. The output of executing the task 112 may result in task logs 104. The task logs 104 include records of events associated with the operations of the application 102 and operations performed on the application 102 by users accessing the application 102.

One or more network nodes 130 may send the task logs 104 to the server 170. The server 170 maintains the task logs 104 for troubleshooting, archiving, and other purposes. In some cases, the application 102 may fail, e.g., due to an error or a bug in code that is used to implement the application 102. For example, the application 102 may fail and a webpage, or a user interface page, a menu on the application 102 may not load. In such cases, a respective task log 104 may include the event that led to the failure of the application 102 and operations that happened at the failure time.

In certain embodiments, the organization 108 (e.g., via the server 170) may communicate the task logs 104 to a third-party vendor 122 for debugging, troubleshooting, and determining the cause of the failure. In some cases, the task logs 104 may include confidential information 180. The confidential information 180 may include private user information, such as social security number, name, address, card number, and proprietary information related to the network nodes 130, such as hostname, port number, database name, network node name, communication protocol, etc. The third-party vendor 122 may not have the authority to access the confidential information 180. Thus, the server 170 may be configured to detect and obfuscate the confidential information 180 in the task logs 104 before sending the task logs 104 to the third-party vendor 122.

System Components
Network

Network 110 may be any suitable type of wireless and/or wired network. The network 110 is not connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

Third-Party Vendor

Each third-party vendor 122 may be an organization that provides services and/or products to its users. A third-party vendor 122 may receive task logs 104 for troubleshooting and debugging a failure that has led to the application 102 failing as described above. For example, the third-party vendor 122 may receive the task logs 104 from the server 170 via the computing device 120 associated with the third-party vendor 122.

Each third-party vendor 122 may be associated with one or more computing devices 120. In the illustrated embodiment, the third-party vendor 122a is associated with the computing device 120a, and the third-party vendor 122n is associated with the computing device 120n.

Each of the computing devices 120a and 120n is an instance of the computing device 120. Computing device 120 is generally any device that is configured to process data and interact with users. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by users. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110.

Distributed Computing Network

Distributed computing network 106 may be a cloud of network nodes 130, and generally configured to execute tasks 112 in a distributed environment. For example, the server 170 executes or runs the application 102 so that users or clients of the organization 108 can access the application 102 from their computing devices, e.g., smartphones, desktop computers, laptops, etc. (not shown).

When the server 170 executes the application 102, the server 170 may employ the distributed computing network 106 to execute the tasks 112, similar to that described above. The task 112 may be divided into smaller portions and each portion may be forwarded to a different network node 130. The network nodes 130 may execute the task 112 and produce or output task logs 104. The task logs 104 are transmitted to the server 170.

Each of the network nodes 130a and 130n may be an instance of a network node 130. Network node 130 is generally any device that is configured to process data, such as the tasks 112. Examples of the network node 130 include, but are not limited to, a personal computer, a desktop computer, a workstation, a server, a virtual machine, and the like. The network node 130 may include a hardware processor, memory, and/or circuitry (not explicitly shown) configured to perform any of the functions or actions of the network node 130 described herein. For example, a software application designed using software code may be stored in the memory and executed by the processor to perform the functions of the network node 130. The network node 130 is configured to communicate with other devices via the network 110. The network node 130 may interchangeably be referred to as a container 130.

Blockchain Network

Blockchain network 140 comprises a cloud of computer systems (referred to herein as blocks 142) and is generally configured to keep records of blockchain ledger 160 and any other data, communications and interactions among the blocks 142, and the blockchain transactions 162. The blockchain network 140 may comprise any number of blocks 142. Each block 142 may comprise a computing device, a virtual machine, and/or the like. In the present disclosure, a block 142 may interchangeably be referred to as a network node, a node, or a network device. The blockchain network 140 generally refers to a distributed database (e.g., distributed ledger 160) shared between a plurality of network nodes 142 in a network. The system 100 may employ any suitable number of devices (e.g., network nodes 142) to form a distributed network that maintains the blocks in form of a blockchain. The blockchain links together the blocks 142 of data which may include the blockchain ledger 160.

Each network node 142 comprises a blockchain ledger 160 (e.g., stored in the memory 148) that is configured to store a copy of the blockchain 140 (not explicitly shown), which contains every blockchain transaction 162 executed in the network and any other data. The blockchain 140 links together blocks 142 of data which comprise identifiable units called blockchain transactions 162. Blockchain transactions 162 may comprise information, files, or any other suitable type of data, such as data associated with digital documents, tasks 112, task logs 104, user information, timestamps of tasks 112, timestamps of task logs 104, and any other type of information.

Each block 142 in the blockchain 140 comprises a hash value 154 and information derived from a preceding block 142. For example, every block 142 in the blockchain 140 includes a hash 152 of the previous block 142. By including the hash 152, the blockchain 140 comprises a chain of blocks 142 from a genesis block 142 to the current block 142. Each block 142 is guaranteed to come after the previous block 142 chronologically because the previous block's hash 152 would otherwise not be known. In one embodiment, blocks 142 in a blockchain 140 may be linked together by identifying a preceding block 142 with a cryptographic checksum (e.g., secure hash algorithm (SHA)-256) of its contents (e.g. blockchain transactions 162, and additional metadata stored in the memory 148) which serves as each block's unique identifier. Links are formed by storing the cryptographic checksum identifier of one block 142 in the metadata of another block 142, such that the former block 142 becomes the predecessor of the latter block 142. In this way, the blocks 142 form a chain that can be navigated from block-to-block by retrieving the cryptographic checksum of a particular block's predecessor from the particular block's own metadata. Each block 142 is computationally impractical to modify once it has been in the blockchain 140 because every block 142 after it would also have to be regenerated. These features protect data stored in the blockchain 140 from being modified by bad actors. Thus, these features improve the information security of the data stored in the blockchain 140.

The consensus module 158 is configured to establish a consensus among the blocks 142 about the present state of the distributed ledger 160. For example, the consensus module 158 may be executed by the processor 144 executing the software instructions 150 to implement a procedure through which all the blocks 142 of the blockchain network 140 reach a common agreement about the present state of the distributed ledger 160. In this way, consensus module 158 in each block 142 achieves reliability in the blockchain network 140 and establish trust between the blocks 142 in a distributed computing environment. The consensus module 158 implements a consensus protocol to perform its operations. Essentially, the consensus protocol makes sure that every new block 142 that is added to the blockchain 140 is the one and only version of the truth that is agreed upon by all the nodes 142 in the blockchain 140.

When a network node 142 publishes an entry (e.g. a blockchain transaction 162) in its blockchain ledger 160, the blockchain 140 for all other network nodes 142 in the distributed network is also updated with the new entry. Thus, data published in a blockchain 140 is available and accessible to every network node 142 with a blockchain ledger 160. This allows the data stored in the block 142 to be accessible for inspection and verification at any time by any device with a copy of the blockchain ledger 160.

Each of the blocks 142a-142d is an instance of a block 142. Each block 142 may comprise a processor 144 in signal communication with a memory 148 and a network interface 146.

Processor 144 comprises one or more processors operably coupled to the memory 148. The processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations. The processor 144 may register the supply operands to the ALU and stores the results of ALU operations. The processor 144 may further include a control unit that fetches instructions from memory and executes them by directing the coordinated operations of the ALU, registers and other components. The one or more processors are configured to implement various software instructions. For example, the one or more processors are configured to execute software instructions 150 to perform one or more functions described herein. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1-7.

Network interface 146 is configured to enable wired and/or wireless communications (e.g., via network 110). The network interface 146 is configured to communicate data between the network node 142 and other devices (e.g., computing devices 120), server 170, other network nodes 142, databases, systems, or domains. For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1-7 along with any other data, instructions, logic, rules, or code operable to implement the function(s) described herein when executed by processors 144. The memory 148 is operable to store software instructions 150, previous block hash value 152, hash value 154, data 156, consensus module 158, blockchain ledger 160, and/or any other data and instructions. The data 156 may include timestamps of reception of tasks 112, execution of tasks 112, index of the block 142, etc. The hash value 154 may be used to uniquely identify the corresponding network node 142. For example, the hash value 154 may include an alphanumerical string. The hash 152 of the previous block 142 may include a hash value 152 of the previous block 142 generated before the corresponding block 142. The order and place of the block 142 in the blockchain 140 may be determined by the hash 152 of the previous block 142. The software instructions 150 may comprise any suitable set of software instructions, logic, rules, or code operable to execute the processor 144 to perform the functions of the processor 144 and the block 142 described herein.

Each block 142 may include information derived from a preceding block 142. For example, every block 142 in the blockchain includes a hash 152 of the previous block 142. By including the hash 152 of the previous block 142, the blockchain network 140 includes a chain of blocks 142a to 142d from a genesis block 142a (or a block not shown to the left of the block 142a in the example of FIG. 1) to the latest block 142d (or a block not shown to the right of the block 142d in the example of FIG. 1). Each block 142 is guaranteed to come after the previous block 142 chronologically because the previous block's hash value 152 would otherwise not be known.

Server

Server 170 is generally a device that is configured to process data and communicate with computing devices (e.g., computing devices 120), blockchain network 140, network nodes 130, databases, systems, etc., via the network 110. The server 170 may be associated with the organization 108. The server 170 is generally configured to oversee the operations of the processor 172 as described further below in conjunction with the operational flow 200 of system 100 described in FIG. 2, the operational flow 300 of system 100 described in FIG. 3, the operational flow 400 of system 100 described in FIG. 4, and methods 500-700 described in FIG. 5-7, respectively.

Processor 172 comprises one or more processors operably coupled to the memory 176. The processor 172 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 172 may be a programmable logic device, a microcontroller, a microprocessor, or any suitable combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 178) to implement the processor 172. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-7. For example, the processor 172 may be configured to perform one or more operations of methods 500, 600, and 700 as described in FIGS. 5-7, respectively.

Network interface 174 is configured to enable wired and/or wireless communications. The network interface 174 may be configured to communicate data between the server 170 and other devices, systems, or domains. For example, the network interface 174 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be volatile or non-volatile and may comprise read-only memory (ROM), random-access memory (RAM), ternary content-addressable memory (TCAM), dynamic random-access memory (DRAM), and static random-access memory (SRAM). The memory 176 may include one or more of a local database, cloud database, network-attached storage (NAS), etc. The memory 176 comprises one or more disks, tape drives, or solid-state drives, and may be used as an over-flow data storage device, to store programs when such programs are selected for execution, and to store instructions and data that are read during program execution. The memory 176 may store any of the information described in FIGS. 1-7 along with any other data, instructions, logic, rules, or code operable to implement the function(s) described herein when executed by processor 172. For example, the memory 176 may store applications 102, task logs 104, tasks 112, software instructions 178, confidential information 180, memory resource configuration engine 182, memory resource configuration 184, obfuscation engine 188, machine learning module 190, patterns 192, training dataset 194, probability score 196, anomaly detection engine 198, historical memory resources 210, memory categories 214, total historical memory resources 216, execution times 218, linear equations 224, memory resource configuration 184, memory resource utilization 212, threshold memory resource utilization 222, anomalies 410, and/or any other data or instructions. The software instructions 178 may comprise any suitable set of instructions, logic, rules, or code operable to execute the processor 172 and perform the functions described herein, such as some or all of those described in FIGS. 1-7.

Memory Resource Configuration Engine

Memory resource configuration engine 182 may be implemented by the processor 172 executing software instructions 178, and is generally configured to determine a more optimal memory resource configuration 184 for network nodes 130.

One approach to configure the network nodes 130 is to configure their memory resources using a default memory resource configuration 220. In the default memory resource configuration 220, a default value for amount of memory resources is assigned or allocated to different memory categories 214 of each network node 130.

The memory categories 214 may be used for various operations at a network node 130. The memory categories 214 associated with a container 130 may include a first memory resource for data storage, a second memory resource for an input and output data transfer to a hard drive, a third memory resource for a memory buffer used for data transfer between a central processing unit and the hard drive, a fourth memory resource for a cache memory used for executing instructions of the central processing unit, and a fifth memory resource used for virtual memory buffering. For example, the memory categories 214 may include the first memory resource related to for data size (e.g., 2048 megabytes (Mb), the second memory resource related to Disk Input/Output that is input and output operations involving a physical memory disk (e.g., 197 Mb for data transfer between the hard disk and RAM), the third memory resource related to RAM (e.g., 5120 Mb), the fourth memory resource related to Cache (e.g., 360 Mb), and the fifth memory resource related to Java virtual memory (JVM), e.g., 10×Cache×1024 Mb. However, this approach suffers from several drawbacks. For example, the default memory resource configuration 220 may not an optimal configuration to run every task 112. Some tasks 112 may need more memory resources, while other tasks 112 may need fewer memory resources.

The memory resource configuration engine 182 is configured to determine a more optimal memory resource configuration 184 for each container 130 to execute tasks 112 and future tasks 112. This process is described in greater detail in FIG. 2.

Obfuscation Engine

Obfuscation engine 188 may be implemented by the processor 172 executing software instructions 178, and is generally configured to detect and obfuscate confidential information 180 in task logs 104. In certain embodiments, the obfuscation engine 188 may implement a machine learning module 190 to perform its operations. In certain embodiments, the machine learning module 190 may include a density-based clustering algorithm that does not require any predefined number of clusters to determine patterns 192 in the text of log files 104.

In certain embodiments, the machine learning module 190 may utilize a heterogeneous density-based spatial clustering of application and noise algorithm for various application logs 104 to segregate and determine a series of patterns 192 to identify confidential information 180, obfuscate the confidential information 180, and store the task log 104 with obfuscated confidential information 180 in blockchain ledger 160 of the blockchain network 140.

In certain embodiments, the machine learning module 190 may include a support vector machine, neural network, random forest, k-means clustering, etc. In certain embodiments, the machine learning module 190 may be implemented by a plurality of neural network layers, convolutional neural network layers, Long-Short-Term-Memory (LSTM) layers, Bi-directional LSTM layers, recurrent neural network layers, and the like. In certain embodiments, the machine learning module 190 may include text processing, text parsing, text analysis, or any other linguistic analysis algorithm. In certain embodiments, the machine learning module 190 may perform word tokenization, sentence tokenization, word segmentation, sentence segmentation, word-tagging, sentence tagging, word sequences, sentiment analysis, and/or any other linguistic pattern analysis.

The task logs 104 may be in various data formats or data structures. Thus, in certain embodiments, the machine learning module 190 is configured to detect confidential information 180 in a task log 104 that is in any data format, such as unstructured data format, structured data format, and semi-structured data format. The task logs 104 may be compressed by any compression technique. Various compression techniques may cause the text in the task logs 104 to be different than its original state (i.e., uncompressed state). In certain embodiments, the machine learning module 190 may be configured to detect confidential information 180 in a task log 104 that is compressed by any compression technique.

The obfuscation engine 188 may implement the machine learning module 190 to detect the confidential information 180 in task logs 104. In response, the obfuscation engine 188 obfuscates the detected confidential information 180.

The machine learning module 190 is trained to detect confidential information 180 using a training dataset 194. The training dataset 194 may include a lexicon of words, numbers, and/or symbols that are associated with the confidential information 180 and/or are the confidential information 180. In the training process, the machine learning module 190 is given historical task logs 104 that each may or may not include confidential information 180. If a historical task log 104 includes confidential information 180, it is labeled as such and the confidential information 180 is marked (e.g., indicated as confidential information). If a historical task log 104 does not include confidential information 180, it is labeled as such indicating that it does not include confidential information 180.

The obfuscation engine 188 feeds the historical task logs 104 to the machine learning module 190. The machine learning module 190 parses the historical task logs 104 and learns the patterns 192 of the text in each historical task logs 104. In this process, the machine learning module 190 extracts features of the historical task logs 104, where the features are represented by a vector of numerical values. The machine learning module 190 learns the relationships and associations between different words, numbers, and symbols in the historical task logs 104.

The machine learning module 190 may be implemented by a set of rules to identify the confidential information 180. The set of rules may include a rule that indicates if a word is followed by a port number, it is a confidential information 180, a rule that indicates if a word is followed by a date or timestamp, it is confidential information 180, among others. The set of rules may also indicate a type of confidential information 180, e.g., a rule may indicate if a word is followed by a data or timestamp, it is confidential information 180 and its is type is a server name. In this manner, the machine learning module 190 may determine patterns 192 of text in the task logs 104.

In the testing process, the machine learning module 190 is given unlabeled task logs 104 and is asked to predict which portions or words of the task log 104 is among the confidential information 180.

In refining process, the machine learning module 190 goes through a backpropagation process where the results of the machine learning module 190 are evaluated and used as feedback to refine weight and bias values of the machine learning module 190. The operation of detecting and obfuscating the confidential information 180 is described in greater detail in FIG. 3.

Anomaly Detection Engine

Anomaly detection engine 198 may be implemented by the processor 172 executing software instructions 178, and is generally configured to detect anomalies in blockchain transactions 162 and update the distributed ledger 160 based on the detection of anomalies 410. The operation of detecting anomalies in blockchain transactions 162 and updating the distributed ledger 160 based on the detected anomalies 410 is described in greater detail in FIG. 4.

Figure 2:
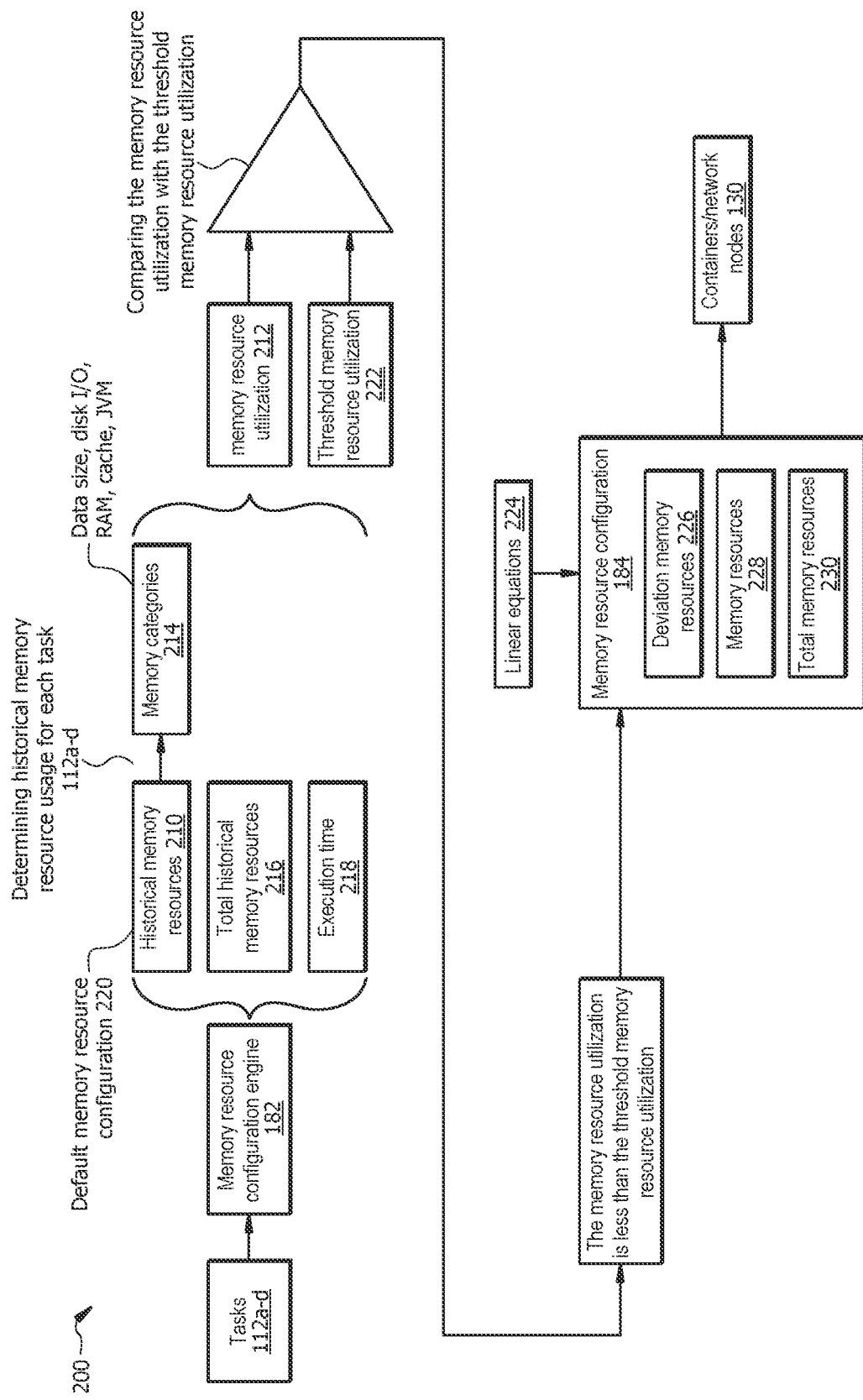
FIG. 2 illustrates an example operational flow of system of FIG. 1 for determining memory resource configuration for network nodes to operate in a distributed computing environment.

Example Operational Flow for Determining Memory Resource Configurations for Containers FIG. 2 illustrates an example operational flow 200 of system 100 of FIG. 1 for determining memory resource configurations 184 for containers 130. As discussed in FIG. 1, tasks 112 are sent to containers 130 to be executed in the distributed computing network 106. Typically, the containers 130 are configured with a default memory resource configuration 220 which is not optimal to execute various tasks 112. For example, the default memory resource configuration 184 may result in a memory resource utilization 212 that is less than a threshold memory resource utilization 222 (e.g., less than 50%, 40%, etc.) at the network nodes 130 executing the tasks 112. In another example, the default memory resource configuration 184 may lead to an increase in application 102 downtime due to the unresolved failure in the task 112 and task logs 104. The system 100 may implement the operational flow 200 to determine a more optimal memory resource configuration 184 for the containers 130 to execute tasks 112. As a result, the efficiency in executing tasks 112 is increased and the application 102 downtime is reduced.

Determining Historical Memory Resource Utilization

The server 170 may implement the memory resource configuration engine 182 to perform the operational flow 200. The memory resource configuration engine 182 accesses historical tasks 112. The historical tasks 112 may include the tasks 112 that the containers 130 have performed using the default memory resource configuration 220.

The memory resource configuration engine 182 determines historical memory resources 210 used to execute each of the historical tasks 112. The historical memory resources 210 may be the memory resources used in the default memory resource configuration 220. The historical memory resources 210 may be associated with memory categories 214 used for various operations of a container 130.

The memory resource configuration engine 182 determines total historical memory resources 216 allocated for each memory category 214. An example table illustrating a default memory resource configuration 220 for a container 130 is illustrated in Table 1.

TABLE 1

Example default memory resource configuration 220.

| Memory category 214 | Amount of memory resource (Mb) |
| --- | --- |
| Data size | 2048 |
| Disk I/O | 197 |
| RAM | 5120 |
| Cache | 360 |
| JVM | 10 * Cache * 1024 |

In Table 1, a total memory resource is divided or allocated to five memory categories 214 to perform various operations of a container 130. The example in Table 1 is for illustration purposes only and is not meant to limit the score of the present disclosure. In other examples, other memory categories 214 may be included in the default memory resource configuration 220. In other examples, other memory resources may be allocated to each memory category 214.

An example table illustrating the historical tasks 112 for different applications 102, historical memory resources 210, and total historical memory resources 216, and time taken 18 to execute each historical task 112 is illustrated in Table 2.

TABLE 2

Example historical memory resources 210 used to execute historical tasks 112.

| Memory category 214 (Mb) | Historical task 112a | Historical task 112b | Historical task 112c | Historical task 112d | Task utilization pool/Total historical memory resources 216 |
| --- | --- | --- | --- | --- | --- |
| Data Size | 240 | 32 | 22 | 34 | 6120 |
| Disk I/O | 31 | 210 | 31 | 21 | 5440 |
| RAM | 31 | 34 | 310 | 30 | 6670 |
| Cache | 24 | 35 | 24 | 360 | 5270 |
| JVM | 37 | 14 | 34 | 14 | 6150 |
| Execution time 218 | 16060 hours | 15200 hours | 17090 hours | 16030 hours | |

In the example of Table 2, the first historical task 112a is associated with a first application 102, the second historical task 112b is associated with a second application 102, the third historical task 1120c is associated with a third application 102, and the fourth historical task 112d is associated with a fourth application 102. In this example, the first historical task 112a may be associated with a first third-party vendor 122, the second historical task 112b may be associated with a second third-party vendor 122, the third historical task 112c may be associated with a third third-party vendor 112, and the fourth historical task 112d may be associated with a fourth third-party vendor 112.

In the example of Table 2, the historical task 112a has used 240 Mb data size, 31 Mb disk I/O, 31 Mb RAM, 24 Mb Cache, and 37 Mb JVM. The historical task 112a took 16060 hours to complete, i.e., the execution time 218 of the historical task 112a. In the example of Table 2, the historical task 112b has used 32 Mb data size, 210 Mb disk I/O, 34 Mb RAM, 35 Mb Cache, and 14 Mb JVM. The historical task 112b took 15200 hours to complete, i.e., the execution time 218 of the historical task 112b. In the example of Table 2, the historical task 112c has used 22 Mb data size, 31 Mb disk I/O, 310 Mb RAM, 24 Mb Cache, and 34 Mb JVM. The historical task 112c took 17090 hours to complete, i.e., the execution time 218 of the historical task 112c. In the example of Table 2, the historical task 112d has used 34 Mb data size, 21 Mb disk I/O, 30 Mb RAM, 360 Mb Cache, and 14 Mb JVM. The historical task 112d took 16030 hours to complete, i.e., the execution time 218 of the historical task 112d.

In the example of Table 2, the total historical memory resource 216 for the data size memory category 214 across all historical tasks 112 is 6120 Mb. In the example of Table 2, the total historical memory resource 216 for the disk I/O memory category 214 across all historical tasks 112 is 5440 Mb. In the example of Table 2, the total historical memory resource 216 for the RAM memory category 214 across all historical tasks 112 is 6670 Mb. In the example of Table 2, the total historical memory resource 216 for the Cache memory category 214 across all historical tasks 112 is 5270 Mb. In the example of Table 2, the total historical memory resource 216 for the JVM memory category 214 across all historical tasks 112 is 6150 Mb.

In certain embodiments, the memory resource configuration engine 182 determines the historical memory resources 210, total historical memory resources 216, and execution time 218 based on analyzing the execution of the historical tasks 112. For example, the memory resource configuration engine 182 may receive a report of the execution of the historical tasks 112 from one or more containers 130.

Determining a More Optimal Memory Resource Configuration to Execute Tasks

Now that the memory resource configuration engine 182 has determined the parameters described above, it may analyze these parameters to determine a more optimal memory resource configuration 184. For example, as discussed above, using the default memory resource configuration 220, the memory resource utilization 212 may become less than the threshold memory resource utilization 222. To improve the memory resource utilization of the container 130 executing the tasks 112, the memory resource configuration engine 182 may perform one or more operations below.

The memory resource configuration engine 182 determines the memory resource utilization 212 based on analyzing the historical memory resource 210 allocations to each task 112, total historical memory resources 216 for each memory category 214, and execution time 218 for each task 112. The memory resource utilization 212 may be represented by a percentage number, 50%, 45%, etc.

The memory resource configuration engine 182 compares the memory resource utilization 212 with the threshold memory resource utilization 222. For example, assume that the memory resource configuration engine 182 determines that the memory resource utilization 212 in executing at least on task 112 from the historical tasks 112 is less than the threshold memory resource utilization 222, e.g., less than 50%, 45%, etc. In response, the memory resource configuration engine 182 determines a memory resource configuration 184 based on the historical memory resources 210 and total historical memory resources 216.

The memory resource configuration 184 is determined to be used for configuring each container 130 such that the memory resource configuration 184 yields the memory resource utilization more than the threshold memory resource utilization 222. In this process, the memory resource configuration engine 182 may be tasked to solve an example Equation (1). The Equation (1) may be one of the linear equations 224 that the memory resource configuration engine 182 is asked to solve to determine the parameters for the memory resource configuration 184.

$$\text{MAX}(X1, X2, X3, X4, X5) = \text{total memory } 1*X1 + \text{total memory } 2*X2 + \text{total memory } 3*X3 + \text{total memory } 4*X4 + \text{total memory } 5*X5 \quad \text{Equation (1)}$$

The parameter MAX is a name of the function used to calculate the five unknown parameters X1, X2, X3, X4, and X5. The parameters X1, X2, X3, X4, and X5 are variables to be determined. The parameters X1, X2, X3, X4, and X5 are values of amount of memory resources that can be added to and/or reduced from a corresponding memory resource 210.

The total memory 1 parameter is the total memory resources 216 for the first memory category 214, e.g., data size (which in the example of Table 2 is 6120). The total memory 2 parameter is the total memory resources 216 for the second memory category 214, e.g., disk I/O (which in the example of Table 2 is 5440). The total memory 3 parameter is the total memory resources 216 for the third memory category 214, e.g., RAM (which in the example of Table 2 is 6670). The total memory 4 parameter is the total memory resources 216 for the fourth memory category 214, e.g., Cache (which in the example of Table 2 is 5270). The total memory 5 parameter is the total memory resources 216 for the fifth memory category 214, e.g., JVM (which in the example of Table 2 is 6150). Thus, considering the example of Table 2, the equation (1) may be adapted to equation (2) below.

$$\text{MAX}(X1, X2, X3, X4, X5) = 6120*X1 + 5440*X2 + 6670*X3 + 5270*X4 + 6150*X5 \quad \text{Equation (2)}$$

The memory resource configuration engine 182 may be given the following linear equations as constraints. These linear equations may be included in the linear equations 224 given to the memory resource configuration engine 182 to solve. Considering the example of Table 2, the linear equations considered as constraints (included in the linear equations 224) to solve the Equation (1) may be as equations (3) to (6).

$$240*X1 + 31*X2 + 31*X3 + 24*X4 + 37*X5 \leq 16060 \quad \text{Equation (3)}$$

$$32*X1 + 210*X2 + 34*X3 + 35*X4 + 14*X5 \leq 15200 \quad \text{Equation (4)}$$

$$22*X1 + 31*X2 + 310*X3 + 24*X4 + 34*X5 \leq 17090 \quad \text{Equation (5)}$$

$$34*X1 + 21*X2 + 30*X3 + 360*X4 + 14*X5 \leq 16030 \quad \text{Equation (6)}$$

Since the parameters X1, X2, and X3 are memory resources, non-negativity constraints may be given to the memory resource configuration engine 182, as X1>=0, X2>=0, and X3>=0. In certain embodiments, further non-negativity constraints of X4>=0 and X5>=0 may also be given to the memory resource configuration engine 182.

Based on the given example in Table 2, the memory resource configuration engine 182 determines deviation memory resources 226 (i.e., X1, X2, X3, X4, and X5) to be added to a corresponding memory resource category 214. Based on the deviation memory resources 226, the memory resource configuration engine 182 determines the memory resource configuration 184. Table 3 illustrates an example memory resource configuration 184.

TABLE 3

Example memory resource configuration 184.

| Memory category 214 | Amount of memory resource 228 (Mb) | Deviation memory resources 226 (Mb) | |
|---|---|---|---|
| Data size | 2048 | 0 (no change) | X1 |
| Disk I/O | 197 | 41.63 | X2 |
| RAM | 5120 | 7.72 | X3 |
| Cache | 360 | 26.86 | X4 |
| JVM | Cache + 1024 | 375.27 | X5 |

In the example of Table 3, the first deviation memory resource 226 is 0. This means that for the data size memory category 214, it is determined that no changes to the data size are recommended. This is because if the size of the data is increased beyond the recommended and standard size collections, additional load will be added to the cluster of containers 130 and make the pool of containers 130 out of memory resources for any task execution. Thus, in the optimal memory resource configuration 184, the deviation memory resource 226 for the data size is 0.

In the example of Table 3, the second deviation memory resource 226 is 41.63 Mb for the disk I/O memory category 214. This means that in the optimal memory resource configuration 184, the memory resources to be allocated for the disk I/O is 197 Mb+41.63 Mb=238.63 Mb.

In the example of Table 3, the third deviation memory resource 226 is 7.72 Mb for the RAM memory category 214. This means that in the optimal memory resource configuration 184, the memory resources to be allocated for the RAM is 5120 Mb+7.72 Mb=5127.72 Mb.

In the example of Table 3, the fourth deviation memory resource 226 is 26.86 Mb for the Cache memory category 214. This means that in the optimal memory resource configuration 184, the memory resources to be allocated for the Cache memory is 360 Mb+26.86 Mb=386.86 Mb.

In the example of Table 3, the fifth deviation memory resource 226 is 375.27 Mb for the JVM memory category 214. This means that in the optimal memory resource configuration 184, the memory resources to be allocated for the JVM memory is Cache+1024 Mb+375.27 Mb. This value may vary depending on the Cache memory.

The total memory resources 230 for the optimal memory resource configuration 184 may be 2,727,522 Mb. The total memory resources 230 may be the optimal task utilization pool capacity for a container 130 memory resource configuration. The cluster of containers 130 may utilize this memory capacity at maximum throttle in an efficient manner for any automated task 112.

The memory resource configuration engine 182 may configure each container 130 according to the determined memory resource configuration 184. The memory resource configuration engine 182 may allocate the containers 130 configured according to the determined memory resource configuration 184 to execute future tasks 112.

In certain embodiments, the memory resource configuration engine 182 may determine a set of execution times 218 taken to execute the historical tasks 112, where each execution time 218 is a time period taken to execute each respective historical task 112. Thus, determining the memory resource configuration 184 may be based on the execution time 218 for each historical task 112, the historical memory resources 210, and the total historical memory resources 216.

In certain embodiments, determining the memory resource configuration 184 may include determining the total memory resources to be allocated to each container 130, e.g., 2,727,522 Mb as described above. Thus, the memory resource configuration engine 182 may allocate, from the total memory resources, a set of particular memory resources that includes the memory resource 228 plus the deviation memory resources 226 to a respective memory category 214, as described above with respect to Table 3.

In certain embodiments, determining the memory resource configuration 184 may include solving at least four linear equations 224 in which the particular amount of memory resources (i.e., the deviation memory resources 226) and the total memory resources 230 are unknown parameters, and the historical memory resources 210, total historical memory resources 216, and the execution time 218 for each memory category 214 are known parameters.

In certain embodiments, the at least four linear equations 224 (e.g., equations (3) to (6) indicated as constraints above) are solved such that the amount of the total memory resources 230 is maximized. In certain embodiments, the at least four linear equations 224 (e.g., equations (3) to (6) indicated as constraints above) are solved such that the deviation memory resources 226 are maximized.

Once the containers 130 are configured according to the operational flow 200, the tasks 112 are fed to the containers 130 for processing, parsing, generating task logs 104, detecting confidential information 180, and obfuscating the confidential information 180.

Figure 3:
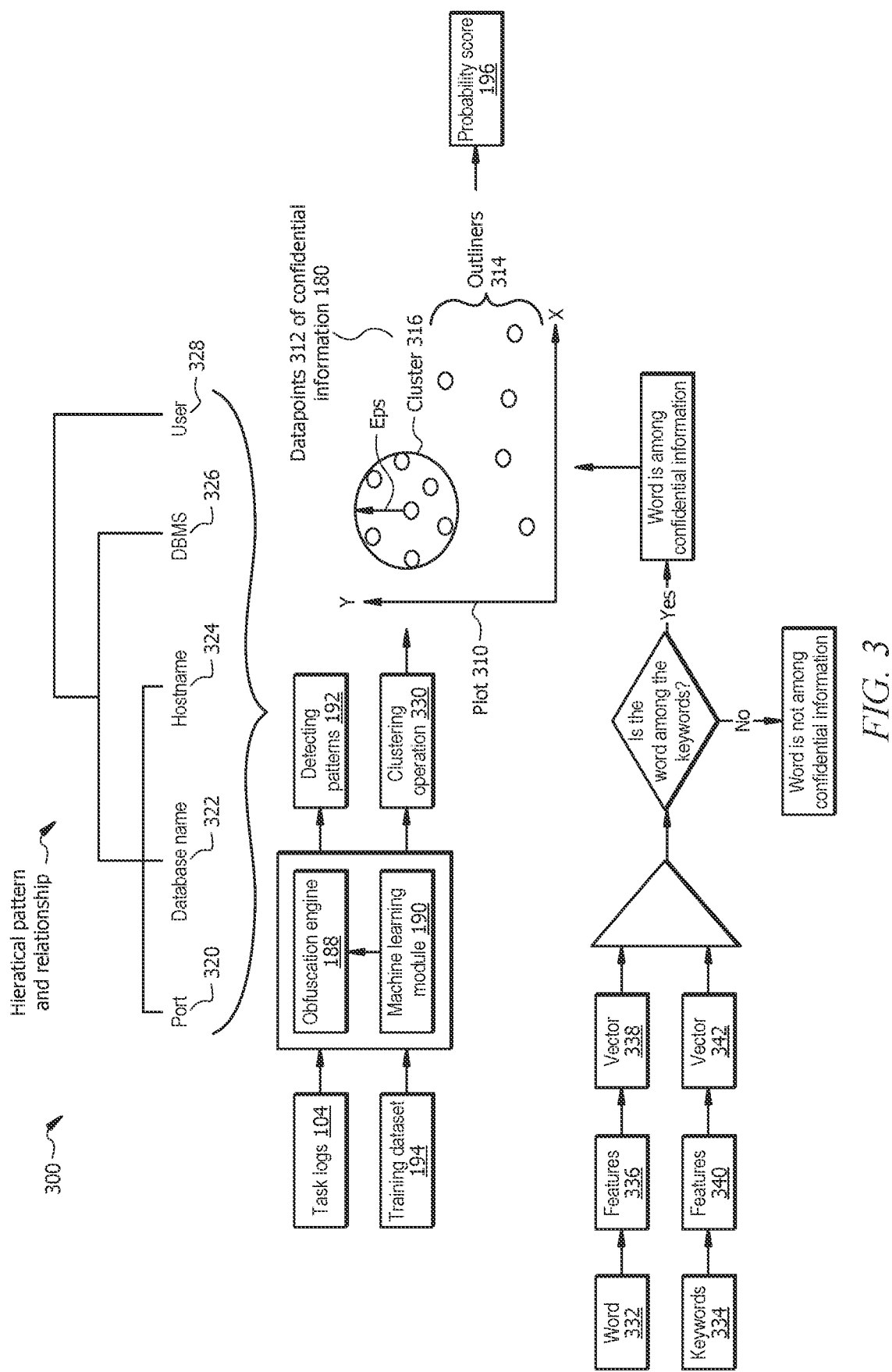
FIG. 3 illustrates an example operational flow of the system of FIG. 1 for detecting and obfuscating confidential information in task logs.

Example Operational Flow for Detecting and Obfuscating Confidential Information in Task Logs FIG. 3 illustrates an example operational flow 300 of system 100 for detecting and obfuscating confidential information in task logs 104. Assume that the containers 130 are configured according to the operational flow 200 described in FIG. 2, the tasks 112 are fed to the containers 130 for processing, parsing, generating task logs 104, detecting confidential information 180, and obfuscating the confidential information 180.

In processing the task logs 104, the obfuscation engine 188 is implemented to detect and obfuscate the confidential information 180. As described in FIG. 1, the task logs 104 may be in various data formats, data structure, and compressed by various compression techniques. For example, a task log 104 may be in a structured data format, and another task log 104 may be in an unstructured data format. The task logs 104 may be compressed by any compression technique. Various compression technique may cause the text in the task logs 104 to be different than its original state (i.e., uncompressed state). The obfuscation engine 188 (e.g., via the machine learning module 190) is configured to detect confidential information 180 in task logs 104 that are in various data formats, data structure, and compressed by various compression techniques.

In certain embodiments, the machine learning module 190 may implement a density-based clustering algorithm as below. The server 170 may receive the tasks 112 from the third-party vendors 122 (via the computing devices 120). The server 170 may send the tasks 112 to the containers 130 for processing in a distributed computing network 106. The containers 130 process the tasks 112 and generate task logs 104, similar to that described in FIGS. 1 and 2. During this process, the task logs 104 are fed to the obfuscation engine 188 to detect and obfuscate the confidential information 180. The obfuscation engine 188 may implement the machine learning module 190 to perform its operations. The machine learning module 190 is trained using the training dataset 194, similar to that described in FIG. 1.

Determining Patterns in the Task Log

The machine learning module 190 parses the task logs 104 and detects patterns 192 of text that are and/or associated with confidential information 180. An example pattern 192 of text that are and/or associated with confidential information 180 is shown in FIG. 3. The machine learning module 190 may extract features from the task log 104, where the features are represented by a vector of numerical values.

In determining the pattern 192, the machine learning module 190 may parse the task log 112 and tokenize each portion of the task log 112. Each portion of the task log 112 may be a word, a number, a symbol, and/or any combination thereof. In certain embodiments, a portion of the task log 112 may be a line or a portion of a line.

The machine learning module 190 may examine or analyze each portion of the task log 112. For example, the machine learning module 190 may determine a port 320, a database name 322, and a hostname 324 in a portion (e.g., a line) of a task log 112. The machine learning module 190 may determine that the port 320, database name 322, and hostname 324 are related based on the training dataset 194 that indicates as such. The machine learning module 190 may also determine that the port 320, database name 322, and hostname 324 are confidential information 180 based on the training dataset 194 that indicates as such. The machine learning module 190 may detect a database management system (DBMS) name 326 in the portion of the task log 112. The machine learning module 190 may determine that the DBMS 326 is related to or associated with the port 320, database name 322, and hostname 324 based on the training dataset 194 that indicates as such. The machine learning module 190 may also determine that the DBMS 326 is confidential information 180 based on the training dataset 194 that indicates as such. The machine learning module 190 may detect a user 328 in the portion of the task log 112. The machine learning module 190 may detect that the port 320, database name 322, hostname 324, and DBMS 326 are associated with the user 328 based on the training dataset 194 that indicates as such. The machine learning module 190 may determine that only the user 328 is authorized to access and view the port 320, database name 322, hostname 324, and DBMS 326 because they are associated with the user 328. Thus, the obfuscation engine 188 may obfuscate the port 320, database name 322, hostname 324, and DBMS 326, and only allow the user 328 to access this information (e.g., making it available to the user 328 by decrypting it upon request) and prevent other users 328 from accessing this information.

The machine learning module 190 may determine that the port 320, database name 322, hostname 324, DBMS 326, and user 328 form the pattern 192. The machine learning module 190 generates the pattern 192 by associating or linking these parameters with each other. The pattern 192 may be a hierarchical pattern and relationship between the port 320, database name 322, hostname 324, DBMS 326, and user 328. In this manner, the machine learning module 190 generates a pattern 192 that is associated with or includes confidential information 180. The machine learning module 190 may use this example pattern 192 as a template to identify and detect similar patterns 192 (that include port 320, database name 322, hostname 324, DBMS 326, and user 328) in the task logs 112. Similarly, the machine learning module 190 may determine and generate other patterns 192 that include other portions of the task log 112.

The machine learning module 190 determines whether a word 332 is among keywords 334 that are known to be confidential information 180 (as indicated in the training dataset 194) as described below. The obfuscation engine 188 may perform these operations for each word 332 in each portion of the task log 104. The obfuscation engine 188 compares the word 323 with each of set of plurality of keywords 334 that are known to be among the confidential information 180. In this process, the obfuscation engine 188 extracts a first set of features 336 from the word 323. The first set of features 336 indicates an identity of the word 332 (e.g., what word is it), among other attributes, including its meaning, where it is used, where it is used in other portions of the task log 104, where it is used in other task logs 104, etc. The first set of features 336 is represented by a first vector 338 of numerical values. The obfuscation engine 188 extracts a second set of features 340 from each keyword 334. For example, assume that the obfuscation engine 188 extracts the second set of features 340 from a first keyword 334. The second set of features 340 indicates an identity of the first keyword 334 (e.g., what word is it), among other attributes, including its meaning, where it is used, where it is used in other portions of the task log 104, where it is used in other task logs 104, etc. The second set of features 340 is represented by a second vector 342. The obfuscation engine 188 compares the first vector 338 with the second vector 342. In this process, the obfuscation engine 188 may perform a dot product between the first vector 338 and the second vector 342. The obfuscation engine 188 may determine an Euclidian distance between the vectors 338 and 342. Thus, the obfuscation engine 188 may determine the similarity between the word 332 and keyword 334. If the obfuscation engine 188 determines that the Euclidian distance between vectors 338 and 342 is less than a threshold percentage (e.g., less than 1%), it determines that the word 332 matches or corresponds to the keyword 334. Otherwise, it determines that they are different. In certain embodiments, the obfuscation engine 188 may determine a percentage of numerical values in the first vector 338 that correspond or match with counterpart numerical values in the second vector 342. The obfuscation engine 188 compares the percentage of the numerical values in the first vector 338 that correspond or match counterpart numerical values in the second vector 342 with a threshold percentage (e.g., 90%, 95%, etc.). If the percentage of the numerical values in the first vector 338 that correspond or match counterpart numerical values in the second vector 342 exceeds the threshold percentage, the obfuscation engine 188 determines that the word 332 matches or corresponds to the keyword 334 (or the word 332 is among the keywords 334). Otherwise, the obfuscation engine 188 determines that the word 332 does not match or correspond to the keyword 334. If it is determined that the word 332 matches the keyword 334, the obfuscation engine 188 determines that the word 332 is among the confidential information 180. Otherwise, the obfuscation engine 188 determines that the word 332 is not among the confidential information 180.

Clustering Confidential Information

The obfuscation engine 188 may perform the clustering operation 330 to cluster the confidential information 180. The clustering operation 330 may include one or more operations described below.

An example plot 310 illustrating example clustering of datapoints 312 of confidential information 180 and outliers 314 is shown in FIG. 3. The machine learning module 190 may represent each portion of a task log 104 by coordinates (x, y) in the plot 310. For example, each work or number in a task log 104 may be represented by coordinates in the plot 310. Each coordinate may be a datapoint 312.

The machine learning module 190 may implement a density-based clustering algorithm that includes several parameters including Epsilon (Eps) and minPts (minimum points) to cluster the confidential information 180. The parameter Eps defines the radius of the neighborhood around a point x, where x is a datapoint 312 with coordinates of confidential information 180 in the two-dimension plot 310. The parameter MinPts is the minimum number of neighbors within the Eps radius. The parameter MinPts may be number of dimensions in the task log 104, as MinPts>=dimension+1. The parameter MinPts may be 2*dimension, if MinPts of at least 3 is used to train the machine learning module 190 and determine the hierarchical clustering of the confidential information 180. This configuration may negate most (or all) of outliers 314 (e.g., noisy data in the clustering process).

The machine learning module 190 may cluster the datapoints 312 of the confidential information 180 as shown in the example plot 310. In the example plot 310, the cluster 316 includes the datapoints 312 of the confidential information 180 that may be associated with a particular pattern 192. Further, in the example plot 310, the outliers 314 are excluded from the cluster 316 because the outliers 314 are determined to not to be among the confidential information 180. The corresponding description below described an example process of training the machine learning module 190 to perform the clustering operation 330. The machine learning module 190 may be trained by computing the equation (7) below.

$$\text{Model} = \text{DBSCAN}(\text{eps}=0.3, \text{min\_samples}=1000) \cdot \text{fit}(x) \quad \text{Equation (7)}$$

The parameter "Model" is a name used to save the output of the machine learning module 190. The parameter eps is the Epsilon parameter described above. The min_samples parameter indicates the minimum number of samples to process.

The machine learning module 190 may execute the equation (7) to perform the clustering operation 330. The output of the equation (7) may be one or more clusters 316 of confidential information 180. In certain embodiments, each cluster 316 may be associated with a different pattern 192. In certain embodiments, each cluster 316 may be associated with a different type of confidential information 180 (e.g., port, database name, server name, etc.).

Determining the Probability Score of Confidential Information

In certain embodiments, the machine learning module 190 may determine the distance between spatial coordinates (i.e., the datapoints 312) representing words and numbers in the task log 104 to determine whether they belong to the same cluster 316. For example, machine learning module 190 may determine the distance between datapoints A and B as below.

$$\text{Dist}(A, B) = 1 - \text{Score}(A_i, B_i) / \text{Max}(\text{len}(A), \text{len}(B)) \quad \text{Equation (8)}$$

Where, i=1 to Min(len(A),len(B))
Score(a,b)=k1 if a=b
Score(a,b)=0 otherwise

Where the Dist is a distance function to calculate the distance between datapoints A and B (e.g., two datapoints 312). The score parameter is a probability score 196 that represents a probability of a word, text, number, and/or a symbol in the task log 104 is confidential information 180. The Max(len(A),len(B)) function calculates which of len(A) or len(B) is the maximum. The Min(len(A),len(B)) function calculates which of len(A) or len(B) is the minimum.

In certain embodiments, the parameter K1 may be 1 by default while implementing log distance function to add or reduce weight on the pattern matching fields between two portions of a task log 104. If a=b, the output of the Score(a,b) is K1. Otherwise, the Score(a,b) is zero. For example, if the probability score 196 associated with a portion of the task log 104 is 90%, it is determined that there is 90% probability that the portion of the task log 104 is among the confidential information 180.

In certain embodiments, the machine learning module 190 may determine a probability score 196 for each portion of the task log 104. For example, the machine learning module 190 may select a portion of the task log 104 (e.g., a word, a number, a symbol). The machine learning module 190 may determine a probability score 196 for the portion of the task log 104. In this process, the machine learning module 190 may extract features of the portion of the task log 104 and compare them with features of previously known confidential information 180 in the training dataset 194. The extracted features may be represented by a vector of numerical values.

The machine learning module 190 determines a percentage (e.g., more than 90%) of the features of the portion of the task log 104 corresponds or matches with counterpart features of previously known confidential information 180 in the training dataset 194. The determined percentage of the features of the portion of the task file 104 that match the counterpart features of the previously known confidential information 180 may be the probability score 196. An example portion of a task log is illustrated in Table 4.

TABLE 4

| Example portion of a task log 104. |
| --- |
| 2021-06-12 19:10 INFO URL jdbc:hive2://dyys-hive-new-wyxxbt1.bank.com:10000/;ssl=true; default_db; |
| 2021-06-12 19:15 INFO Server connect to lxxyyyzza2.com |

For example, assume that this example portion of the task log 104 is given to the machine learning module 190. The machine learning module 190 may segregate this portion to produce an output as shown in Table 5.

TABLE 5

| Example output of the machine learning module 190. | | | | | | | |
| --- | --- | --- | --- | --- | --- | --- | --- |
| Jun. 12, 2021 19:10 | INFO | jdbc:hive2:// | dyys-hive-new-wyxxbt1.bank.com | 10000 | ssl | True | Default_db; |
| Jun. 12, 2021 19:15 | INFO | Server connect to | lxxyyyzza2.com | | | | |

The machine learning module 190 may determine the patterns 192 in this portion of the task log 104 by determining the relationships of segregated parts. The machine learning module 190 may predict the identity of each segregated part as shown in Table 6.

TABLE 6

| Example output of the machine learning module 190 predicting the identity of each part of the task log portion in Table 5. | | | | | | | |
| --- | --- | --- | --- | --- | --- | --- | --- |
| date | time | INFO jdbc-string | Hostname | Port | bool | Database | |
| date | time | INFO message | Hostname | | | | |

In the example Table 6, it is determined that the first column is data, second column is time, third column is info (i.e., information about the current line, in other examples it can be warning, error, etc.), fourth column is the name of a server (in the first row), and message (indicating that the server is connecting to another device), fifth column is hostname, sixth column is port number, seventh column is indicating if the secure socket layer (SSL) protocol is enabled or not, and the eighth column is the database name. The machine learning module 190 may determine whether each part (column) is or associated with confidential information 180 based on training dataset 194. In this manner, the machine learning module 190 detects the patterns 192, confidential information 180 and cluster the confidential information 180.

Once the confidential information 180 in the task log 104 is determined, the obfuscation engine 188 obfuscates the confidential information 180. In this process, the obfuscation engine 188 may use an encryption function, such as SHA, MD5, and/or any random number generator.

Figure 4:
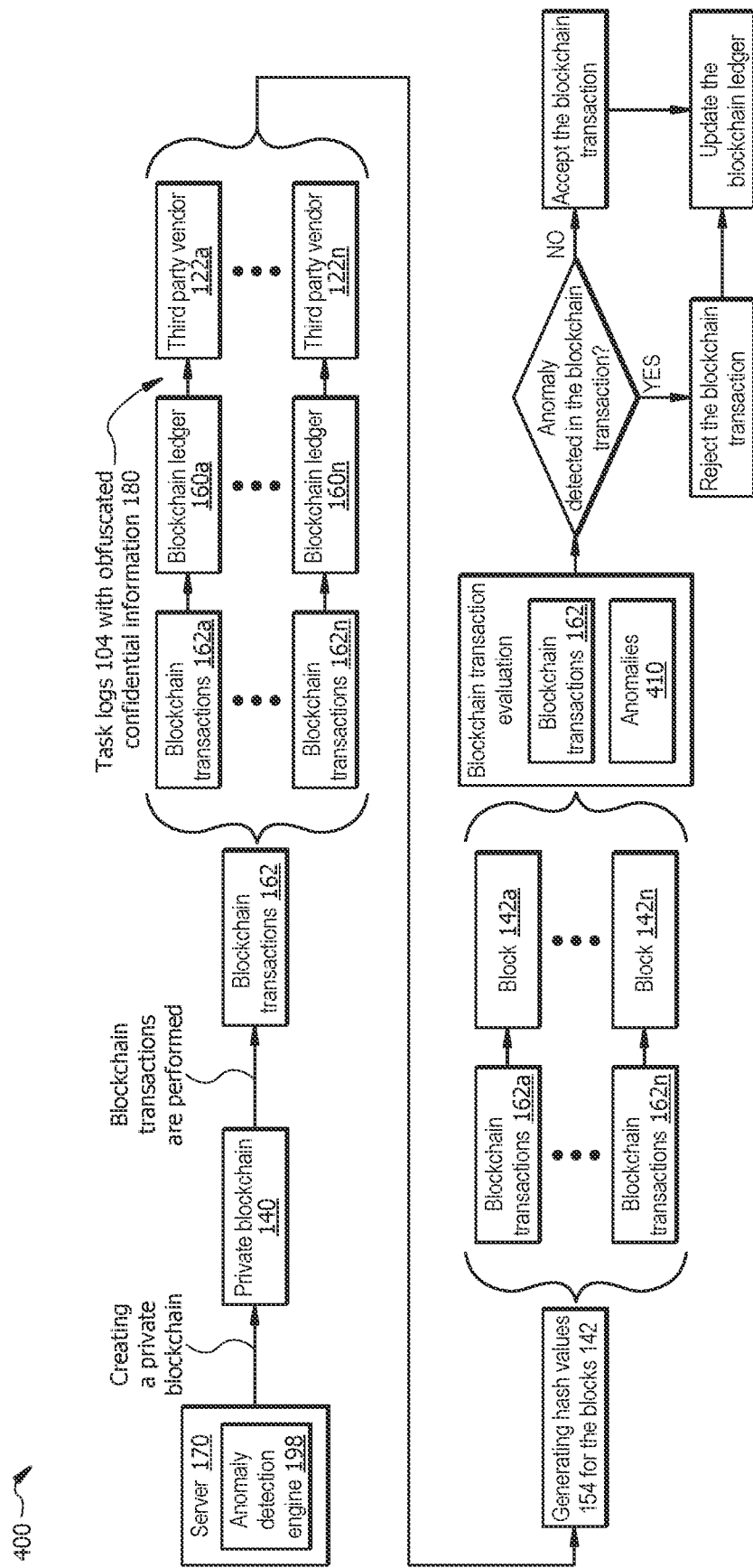
FIG. 4 illustrates an example operational flow of the system of FIG. 1 for detecting anomalies in blockchain transactions and updating a distributed blockchain ledger based on the detected anomalies.

Example Operational Flow for Updating a
Distributed Ledger Based on Anomalies Detected
in Blockchain Transactions FIG. 4 illustrates an example operational flow 400 of system 100 (see FIG. 1) for updating a distributed ledger 160 based on anomalies 410 detected in blockchain transactions 162. In certain embodiments, the operational flow 400 may begin when a private blockchain 140 is created. For example, the server 170 may initiate creating the private blockchain 140. The server 170 may create the private blockchain 140 when a genesis (i.e., the first) block 142*a* is created and a blockchain ledger 160 is generated to maintain records of blockchain transactions 162.

In certain embodiments, various blockchain ledgers 160 may be assigned to corresponding vendors 122. For example, each of the various blockchain ledgers 160 may be associated with a particular application 102 that is associated with a particular vendor 122.

Conducting Blockchain Transactions

In certain embodiment, each operation of the operational flow 200 of FIG. 2 and operational flow 300 of FIG. 3 may be stored and considered as a blockchain transaction 162. For example, determining the optimal memory resource configuration 184 described in operational flow 200 in FIG. 2 may be considered as a blockchain transaction 162. In another example, configuring the containers 130 with the optimal memory resource configuration 184 described in operational flow 200 in FIG. 2 may be considered as another blockchain transaction 162. In another example, training the machine learning module 190 with the training dataset 194 to detect the confidential information 180 described in operational flow 300 in FIG. 3 may be considered as another blockchain transaction 162. In another example, detecting the patterns 192 described in operational flow 300 in FIG. 3 may be considered as another blockchain transaction 162. In another example, clustering the confidential information 180 described in operational flow 300 in FIG. 3 may be considered as another blockchain transaction 162. In another example, obtaining the results (e.g., the confidential information 180) from the machine learning module 190 described in operational flow 300 in FIG. 3 may be considered as another blockchain transaction 162.

The anomaly detection engine 198 may track the progress of each blockchain transaction 162. Each blockchain transaction 162 may be associated with a particular vendor 122 because each blockchain transaction 162 may be associated with a particular task log 104 and respective application 102. The anomaly detection engine 198 may detect groups of blockchain transactions 162 that are related to various third-party vendors 122.

The anomaly detection engine 198 may generate various blockchain ledgers 160 for different groups of blockchain transactions 162 that are associated with a different third-party vendors 122. For example, the anomaly detection engine 198 may determine that the first group of blockchain transactions 162*a* are related to the vendor 122*a*. In response, the anomaly detection engine 198 may store the blockchain transactions 162*a* in the blockchain ledger 160*a*. The anomaly detection engine 198 may communicate the blockchain transactions 162*a* to the vendor 122*a*.

Similarly, the anomaly detection engine 198 may detect that the second group of blockchain transactions 162*n* are associated with the vendor 122*n*. In response, the anomaly detection engine 198 may store the blockchain transactions 162*n* in the blockchain ledger 160*n*. The anomaly detection engine 198 may communicate the blockchain transactions 162*n* to the vendor 122*n*. In this manner, each vendor 122 may receive a corresponding ledger 160 that it is supposed to receive. Thus, other vendors 122 may not receive data that they are not supposed to receive (e.g., task logs 104 that include confidential information 180 not related to those vendor 122). Each vendor 122 may receive its respective task logs 104 with obfuscated confidential information 180 (e.g., included in the respective blockchain ledger 160).

Creating Hash Values for Blocks in the Blockchain

The server 170 and/or the blocks 142 may generate hash values 154 for the blocks 142. The hash value 154 may be an alphanumerical value uniquely identifying the respective block 142. For example, the server 170, the generis block 142*a*, and/or any other block 142 may generate the hash value 154 for the generis block 142*a*.

Each blockchain transaction 162 may be stored in a different block 142. For example, determining the optimal memory resource configuration 184 described in operational flow 200 in FIG. 2 (that is considered as blockchain transaction 162*a*) may be stored in a first block 142*a*. In another example, obtaining the results (e.g., the confidential information 180) from the machine learning module 190 (that is considered as blockchain transactions 162*n*) described in operational flow 300 in FIG. 3 may be stored in block 142*n*. Block 142*n* may be one of the blocks 142 of the blockchain network 140 described in FIG. 1. In certain embodiments, the blockchain ledgers 160*a-n* may be passed or distributed to all blocks 142.

Evaluating Blockchain Transactions for Detecting Anomalies

The anomaly detection engine 198 may evaluate each blockchain transaction 162 for determining whether it includes an anomaly 410. For example, anomalies 410 may include 1) the memory resource configuration 184 does not lead to a more optimized memory utilization that is more than the threshold memory resource utilization 222 (see FIG. 2), 2) the machine learning module 190 prediction of confidential information 180 is not accurate (e.g., when training the machine learning module 190 with the training dataset 194 and determining that the machine learning module 190 has not predicted confidential information 180 correctly in historical task logs 104 in which the confidential information 180 is labeled), 3) the machine learning module 190 has predicated that a task log 104 does not include any confidential information 180 (where the task log 104 is known to include confidential information 180), 4) a task log 104 has not been evaluated or skipped due to an error, and/or other anomalies 410. If the anomaly detection engine 198 detects an anomaly 410 in a blockchain transaction 162, the blockchain transaction 162 is rejected.

In certain embodiments, a user may review the blockchain transactions 162 and indicate if it includes an anomaly 410. The anomaly detection engine 198 may learn from the behavior of the user to predict whether a future blockchain transaction 162 includes an anomaly 410, in supervised machine learning.

If it is determined that the blockchain transaction 162 does not include anomalies 410, the blockchain transaction 162 is accepted. In certain embodiments, in response, the anomaly detection engine 198 may update the corresponding blockchain ledger 160 to include information that indicates the blockchain transaction 162 does not include an anomaly 410. In certain embodiments, the corresponding blockchain ledger 160 may further be updated to include any addition, modification, deletion, obfuscation that occurred in the respective log files 104.

If it is determined that the blockchain transaction 162 includes an anomaly 410, the blockchain transaction 162 is rejected. In certain embodiments, in response, the anomaly detection engine 198 may remove the blockchain transaction 162 from its respective blockchain ledger 160. In certain embodiments, in response, the anomaly detection engine 198 may update the corresponding blockchain ledger 160 to include information that indicates the blockchain transaction 162 includes an anomaly 410.

In certain embodiments, it is determined that a blockchain transaction 162 failed in case of privacy violation by another vendor 122. For example, if it is determined that a vendor 122 has received a task log 104 associated with another vendor 122 (due to an error), and has accessed confidential information 180 included in the task log 104, the anomaly detection engine 198 determines that the corresponding blockchain transaction 162 is failed due to privacy violation by the other vendor 122.

In certain embodiments, it is determined that a blockchain transaction 162 includes an anomaly 410, a message may be communicated to authorities and respective users to initiate an investigation of the detected anomaly 410.

Figure 5:
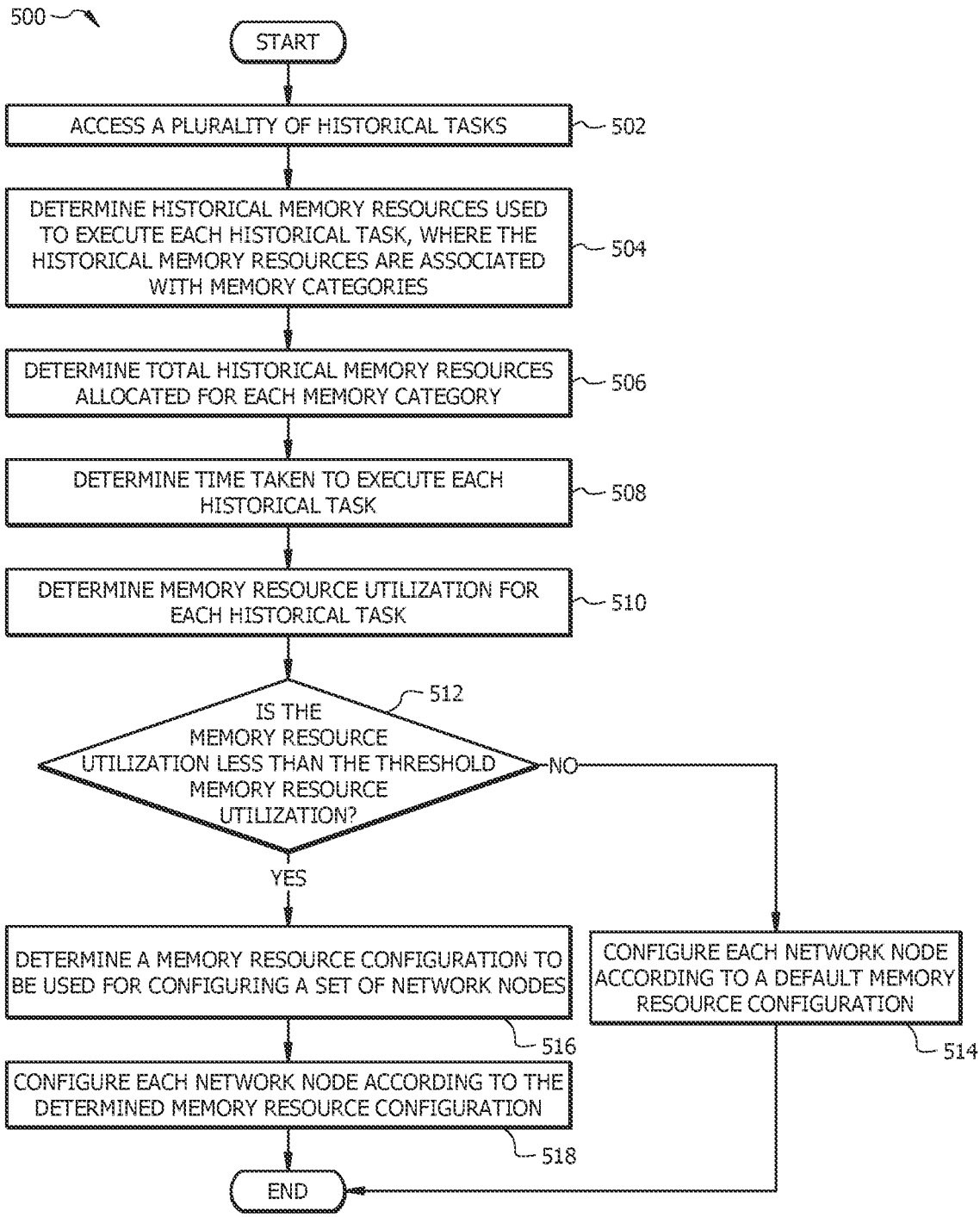
FIG. 5 illustrates an example flowchart of a method for determining memory resource configuration for network nodes to operate in a distributed computing environment.

Example Method for Determining a Memory Resource Configuration for Containers to Execute Tasks FIG. 5 illustrates an example flowchart of a method 500 for determining a memory resource configuration 184 for containers 130 to execute tasks 112. Modifications, additions, or omissions may be made to method 500. Method 500 may include more, fewer, or other operations. For example, operations may be performed in parallel or in any suitable order. While at times discussed as the system 100, blockchain network 140, server 170, or components of any of thereof performing operations, any suitable system or components of the system may perform one or more operations of the method 500. For example, one or more operations of method 500 may be implemented, at least in part, in the form of software instructions 178 of FIG. 1, stored on non-transitory, tangible, machine-readable media (e.g., memory 176 of FIG. 1) that when run by one or more processors (e.g., processor 172 of FIG. 1) may cause the one or more processors to perform operations 502-520.

At 502, the memory resource configuration engine 182 accesses a plurality of historical tasks 112. For example, the historical tasks 112 may be received when the applications 102 are executed, similar to that described in FIG. 2.

At 504, the memory resource configuration engine 182 may determine historical memory resources 210 used to execute each historical task 112, where the historical memory resources 210 are associated with memory categories 214. For example, the memory resource configuration engine 182 may determine the historical memory resources 210 for data size, disk I/O, RAM, Cache, and JVM memory categories 214, similar to that described in FIG. 2.

At 506, the memory resource configuration engine 182 determines total historical memory resources 216 allocated for each memory category 214. For example, the memory resource configuration engine 182 may determine the historical memory resources 216 allocated for each memory category 214 across the tasks 112, similar to that described in FIG. 2.

At 508, the memory resource configuration engine 182 determines time taken (i.e., execution time 218) to execute each historical task 112. For example, the memory resource configuration engine 182 may determine the execution time 218 based on the start time and end time of each historical task 112.

At 510, the memory resource configuration engine 182 determines memory resource utilization 212 for each historical task 112. For example, the memory resource configuration engine 182 may determine the memory resource utilization 212 for each historical task 112 based on analyzing how the memory resources 210 were used in executing a respective historical task 112, similar to that described in FIG. 2. The memory resource configuration engine 182 may determine the memory resource utilization 212 based on analyzing the memory resource 210 usage and efficiency.

At 512, the memory resource configuration engine 182 determines whether the memory resource utilization 212 is less than the threshold memory resource utilization 222. If it is determined that the memory resource utilization 212 is less than the threshold memory resource utilization 222, method 500 proceeds to 516. Otherwise, method 500 proceeds to 514.

At 514, the memory resource configuration engine 182 configures each network node 130 according to a default memory resource configuration 220.

At 516, the memory resource configuration engine 182 determines a memory resource configuration 184 to be used for configuring a set of network nodes 130. For example, the memory resource configuration engine 182 may determine the memory resource configuration 184 by determining the deviation memory resources 226, memory resources 228, and total memory resources 230, similar to that described in FIG. 2.

At 518, the memory resource configuration engine 182 configures each network node 130 according to the determined memory resource configuration 184. In response, the network nodes 130 may be used to process future tasks 112.

Example Method for Obfuscating Confidential Information in Task Logs

Figure 6:
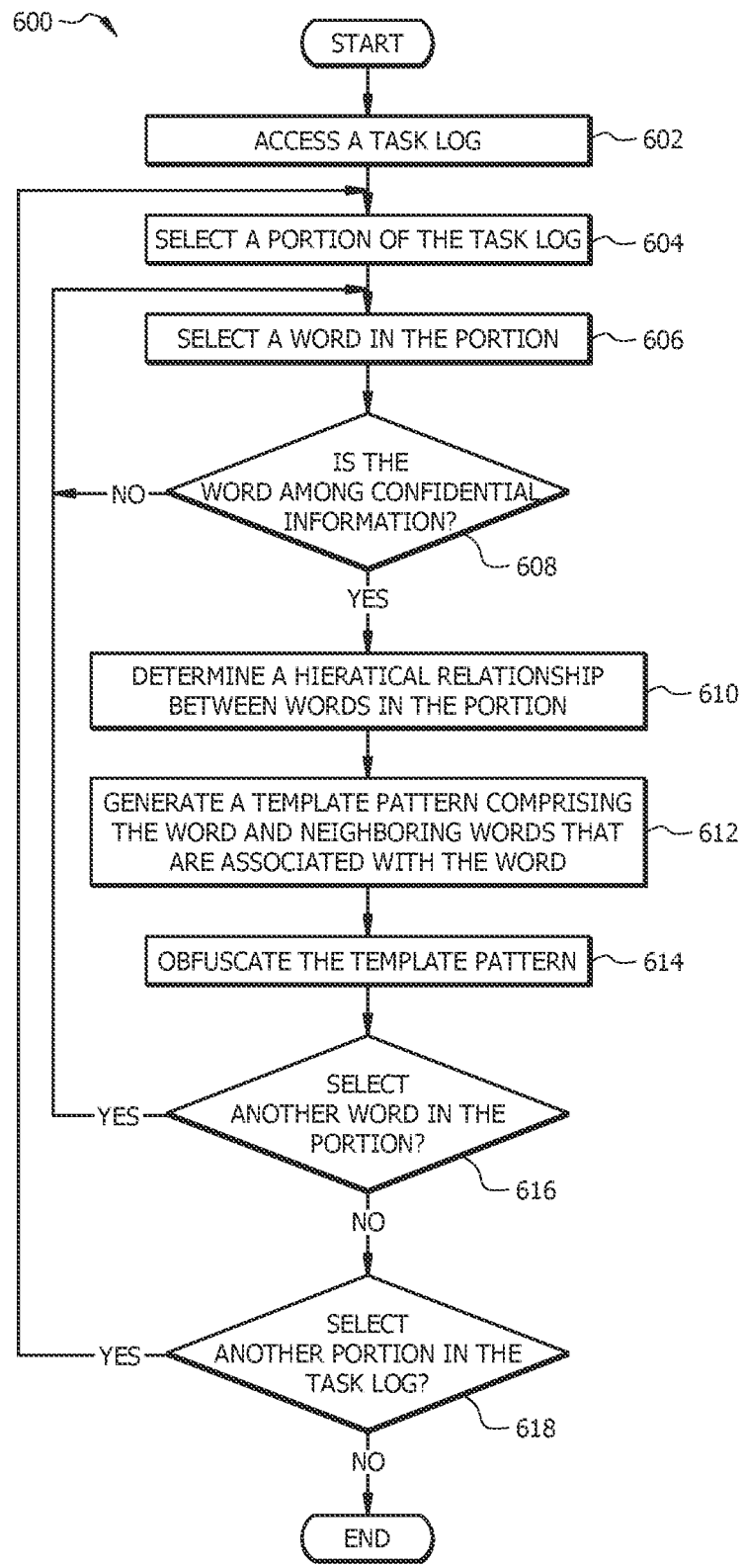
FIG. 6 illustrates an example flowchart of a method for detecting and obfuscating confidential information in task logs.

FIG. 6 illustrates an example flowchart of a method 600 for obfuscating confidential information 180 in task logs 104. Modifications, additions, or omissions may be made to method 600. Method 600 may include more, fewer, or other operations. For example, operations may be performed in parallel or in any suitable order. While at times discussed as the system 100, blockchain network 140, server 170, or components of any of thereof performing operations, any suitable system or components of the system may perform one or more operations of the method 600. For example, one or more operations of method 600 may be implemented, at least in part, in the form of software instructions 178 of FIG. 1, stored on non-transitory, tangible, machine-readable media (e.g., memory 176 of FIG. 1) that when run by one or more processors (e.g., processor 172 of FIG. 1) may cause the one or more processors to perform operations 602-618.

At 602, the obfuscation engine 188 accesses a task log 104. For example, the obfuscation engine 188 may access the task log 104 of the plurality of task logs 104 processed by the network nodes 130, similar to that described in FIGS. 1 and 3.

At 604, the obfuscation engine 188 selects a portion of the task log 104. The portion of the task log 104 may be a line of text, a paragraph, or a number of lines (e.g., one, two, three, etc. lines.) The obfuscation engine 188 may iteratively select a portion of the task log 104 until no portion is left for evaluation. The obfuscation engine 188 may perform the operations below for each portion of the task log 104.

At 606, the obfuscation engine 188 selects a word 332 in the portion of the task log 104. The obfuscation engine 188 may iteratively select a word in the portion of the task log 104 until no word is left for evaluation. The obfuscation engine 188 may perform the operations below for each word in the portion. The word 332 may be any of the port 320, database name 322, hostname 324, DBMS 326, and user 328, described in FIG. 3.

At 608, the obfuscation engine 188 determines whether the word 332 is among the confidential information 180. In this process, the obfuscation engine 188 tokenizes each word 323 in the portion of the task log 104. The obfuscation engine 188 may feed the task log 104 to the machine learning module 190 to perform the operations described herein, similar to that described in FIG. 3. If the obfuscation engine 188 determines that the word 332 is among the confidential information 180, method 600 proceeds to 610. Otherwise, method 600 returns to 606.

At 610, the obfuscation engine 188 determines a hierarchical relationship between words 332 in the portion of the task log 104. For example, the obfuscation engine 188 determines the hierarchical relationship between the word 332 and neighboring words in the portion of the task log 104. The hierarchical relationship between the words 332 indicates whether or not the word 332 is associated with each of the neighboring words 332. Assume that the obfuscation engine 188 may determine that the hierarchical relationship between the word 332 and neighboring words 332 indicates that the word 332 is associated with at least a third word 332 in the portion of the task log 104.

At 612, the obfuscation engine 188 generates a template pattern 192 comprising the word 332 and neighboring words 332 that are associated with the word 332. In this process, the obfuscation engine 188 may compare the template pattern 192 with information stored in the training dataset 194, similar to that described in FIG. 3. The template pattern 192 may include the word 332 and the at least third word 332 in the portion. In certain embodiments, the at least third word 332 may be included in the template pattern 192 even if the at least third word 332 is not among the keywords 334.

At 614, the obfuscation engine 188 obfuscates the template pattern 192, e.g., by encrypting the word 332 and the at least third word 332 using an encryption technique or function.

At 616, the obfuscation engine 188 determines whether to select another word 332 in the portion. The obfuscation engine 188 determines to select another word 332 if at least one word 332 is left for evaluation in the portion. In this case, method 600 returns to 606. Otherwise, method 600 proceeds to 618.

At 618, the obfuscation engine 188 determines whether to select another portion in the task log 104. The obfuscation engine 188 determines to select another portion if at least one portion is left for evaluation in the task log 104. In this case, method 600 returns to 604. Otherwise, method 600 ends.

In certain embodiments, the obfuscation engine 188 may use the template pattern 192 to identify other instances of the template pattern 192 in the task logs 104. The obfuscation engine 188 may obfuscate the identified instances of the template patterns 192. The obfuscation engine 188 communicates the task logs 104 that include obfuscated instances of the template patterns 192 to appropriate third party vendors 122.

In certain embodiments, each of the plurality of task logs 104 has a different data format compared to other task logs 104. In certain embodiments, the different data format comprises structured data format, semi-structured data format, and unstructured data format. In certain embodiments, each task log 104 is compressed with a different compression technique compared to other task logs 104.

In certain embodiments, the obfuscation engine 188 may identify a fourth word 332 in the portion of the task log 104. The fourth word 332 may be a name of a user 328 who is authorized to access the word 332 and the at least third word 332. The user 328 may be a third party vendor 122, described in FIG. 1. After obfuscating the word 332 and the at least third word 332, the obfuscation engine 188 may transmit the obfuscated word 332 and the at least third word 332 to a computing device 120 associated with the user 328. The obfuscation engine 188 may receive a request to decrypt the obfuscated word 332 and the at least third word 332 from the computing device 120. The obfuscation engine 188 may decrypt the obfuscated word 332 and the at least third word 332 and transmit it to the computing device 120.

Figure 7:
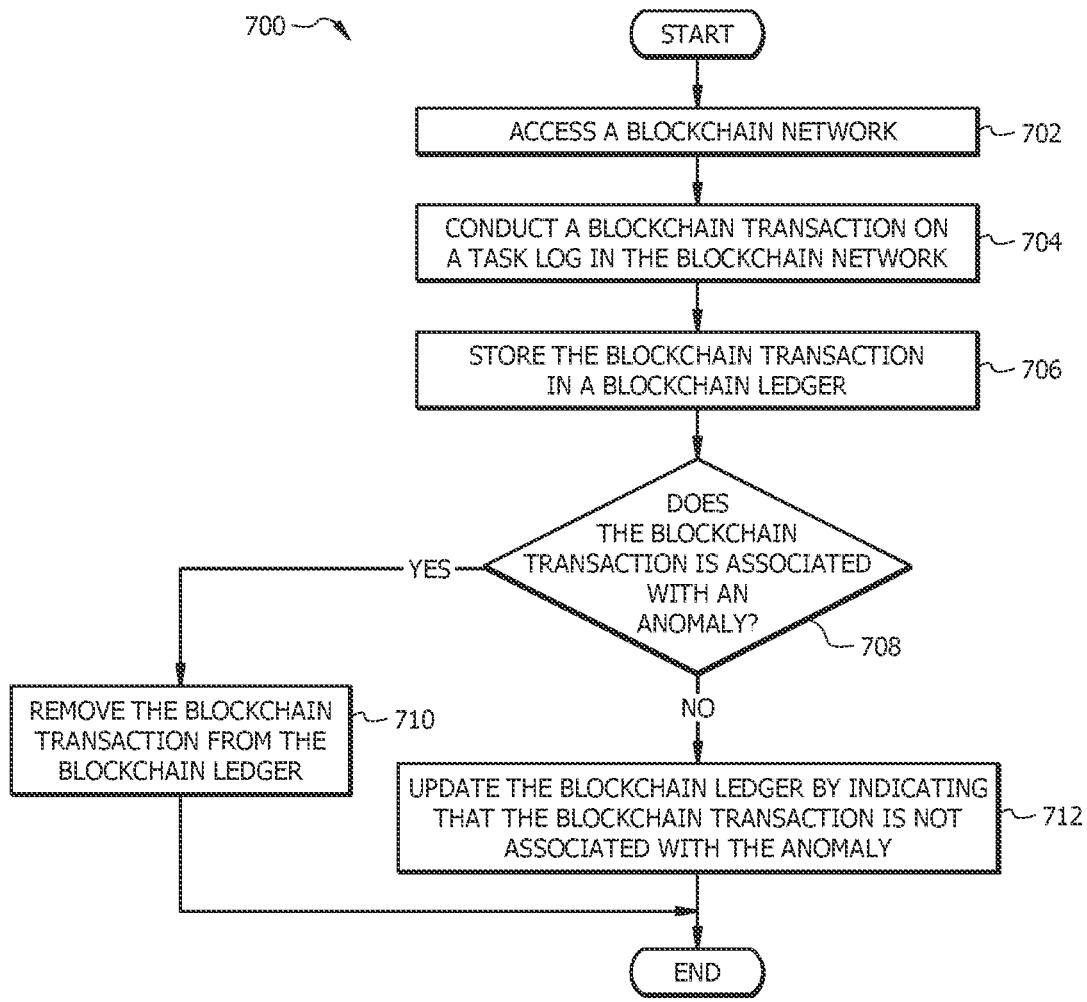
FIG. 7 illustrates an example flowchart of a method for detecting anomalies in blockchain transactions and updating a distributed blockchain ledger based on the detected anomalies.

Example Method for Updating a Blockchain Ledger Based on Detected Anomalies in Blockchain Transactions FIG. 7 illustrates an example flowchart of a method 700 for updating a blockchain ledger 160 based on detected anomalies 410 in blockchain transactions 162. Modifications, additions, or omissions may be made to method 700. Method 700 may include more, fewer, or other operations. For example, operations may be performed in parallel or in any suitable order. While at times discussed as the system 100, blockchain network 140, server 170, or components of any of thereof performing operations, any suitable system or components of the system may perform one or more operations of the method 700. For example, one or more operations of method 700 may be implemented, at least in part, in the form of software instructions 178 of FIG. 1, stored on non-transitory, tangible, machine-readable media (e.g., memory 176 of FIG. 1) that when run by one or more processors (e.g., processor 172 of FIG. 1) may cause the one or more processors to perform operations 702-712.

At 702, the anomaly detection engine 198 accesses a blockchain network 140. In certain embodiments, the server 170 may generate the blockchain network 140, similar to that described in FIG. 4.

At 704, a blockchain transaction 162 is conducted on a task log 104 in the blockchain network 140. For example, the blockchain transaction 162 may be conducted by the server 140, anomaly detection engine 198, and/or one or more blocks 142. The blockchain transaction 162 may be one of the blockchain transactions 162a to 162n described in FIG. 4. The blockchain transaction 162 may be associated with obfuscating the confidential information 180. The blockchain transaction 162 may be configuring one or more network nodes 130 with a particular memory resource configuration 184. The blockchain transaction 162 may be obfuscating the confidential information 180. Other examples of the blockchain transaction 162 are described in FIG. 3.

At 706, the blockchain transaction 162 is stored in a blockchain ledger 160. For example, the blockchain transaction 162 may be stored in the blockchain ledger 160 by the server 140, anomaly detection engine 198, and/or one or more blocks 142.

At 708, the anomaly detection engine 198 determines whether the blockchain transaction 162 is associated with an anomaly 410. The anomaly 410 may indicate that the result of the blockchain transaction 162 is unexpected. Examples of the anomaly 410 are described in FIG. 3. The anomaly 410 may indicate that the memory resource configuration 184 does not lead to a more optimized memory resource utilization 212 that is more than a threshold memory utilization percentage 222 for the network nodes 130 when they are used to obfuscate the confidential information 180. The anomaly 410 may indicate that a prediction result of a machine learning module 190 for detecting the confidential information 180 is less than a threshold prediction percentage (e.g., less than 90%). If it is determined that the blockchain transaction 162 is associated with the anomaly 410, method 700 proceeds to 710. Otherwise, method 700 proceeds to 712.

At 710, the anomaly detection engine 198 removes the blockchain transaction 162 from the blockchain ledger 160. In other embodiments, one or more blocks 142 may remove the blockchain transaction 162 from the blockchain ledger 160.

At 712, the anomaly detection engine 198 updates the blockchain ledger 160 by indicating (e.g., in a message) that the blockchain transaction 162 is not associated with the anomaly 410. If an anomaly 410 is detected, the system 100 (e.g., via the anomaly detection engine 198) may trigger an investigation of the blockchain transaction by authorities. Thus, the blockchain transaction with an anomaly 410 is escalated and addressed, and not remained undetected.

In certain embodiments, the server 170 and/or the blocks 142 identify a vendor 122 that is associated with the blockchain transaction 162 and the blockchain ledger 160. The server 170 and/or the blocks 142 generates a block 142 and store the blockchain ledger 160 in the block 142. The server 170 and/or the blocks 142 distribute the blockchain ledger 160 to other blocks 142. The server 170 and/or the blocks 142 update the status of the blockchain ledger 160 based on whether the anomaly 410 is detected in the blockchain transaction 162.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for obfuscating confidential information in task logs, comprising:
   a memory configured to store:
      a plurality of task logs comprising text that is confidential information, wherein the confidential information comprises at least one of a port number, a database name, and a server name; and
      a training dataset comprising a set of keywords that are known to be among the confidential information;
   a processor operably coupled with the memory, and configured to:
      access the plurality of task logs;
      for a first task log from among the plurality of task logs:
         select a first portion of the first task log, wherein the first portion of the first task log comprises a text line or a paragraph;
         for a first word in the first portion:
            compare the first word with each of the set of keywords, wherein comparing the first word with each of the set of keywords comprises:
               extracting a first set of features from the first word, wherein the first set of features indicates a first identity of the first word, wherein the first set of features is represented by a first vector of numerical values;
               extracting a second set of features from a second word of the set of keywords, wherein the second set of features indicates a second identity of the second word, wherein the second set of features is represented by a second vector of numerical values; and
               comparing the first vector with the second vector;
            determine that the first word is among the set of keywords, wherein determining that the first word is among the set of keywords comprises:
               determining a percentage of numerical values in the first vector that correspond to counterpart numerical values in the second vector;
               comparing the determined percentage of numerical values in the first vector that correspond to counterpart numerical values in the second vector to a threshold percentage;
               determining that the determined percentage of numerical values exceeds the threshold percentage;
            determine a hierarchical relationship between the first word and neighboring words in the first portion, wherein the hierarchical relationship between the first word and the neighboring words indicates whether or not the first word is associated with each of the neighboring words;
            determine that the hierarchical relationship between the first word and the neighboring words indicates that the first word is associated with at least a third word in the first portion;
            generate a template pattern comprising the first word and the at least third word, wherein the template pattern indicates that the first word and the at least third word are among the confidential information; and
            obfuscate the first word and the at least third word.

2. The system of claim 1, wherein obfuscating the first word and the at least third word comprises encrypting the first word and the at least third word using an encryption technique.

3. The system of claim 1, wherein the processor is further configured to:
use the template pattern to identify other instances of the template pattern in the plurality of task logs; and
obfuscate the identified instances of the template pattern; and
communicate the plurality of task logs with the obfuscated instances of the template pattern.

4. The system of claim 1, wherein:
each of the plurality of task logs has a different data format compared to other task logs; and
the different data format comprises structured data format, semi-structured data format, and unstructured data format.

5. The system of claim 1, wherein each of the plurality of task logs is compressed with a different compression technique compared to other task logs.

6. The system of claim 1, wherein the at least third word is included in the template pattern even if the at least third word is not among the set of keywords.

7. The system of claim 1, wherein the processor is further configured to:
identity a fourth word in the first portion, wherein the fourth word is a name of a user who is authorized to access the first word and the at least third word;
after obfuscating the first word and the at least third word, communicate the obfuscated first word and the at least third word to a computing device associated with the user;
receive, from the computing device, a request to decrypt the obfuscated first word and the at least third word;
decrypt the obfuscated first word and the at least third word; and
communicate the decrypted first word and at least third word to the computing device.

8. A method for obfuscating confidential information in task logs, comprising:
accessing a plurality of task logs comprising text that is confidential information, wherein the confidential information comprises at least one of a port number, a database name, and a server name;
for a first task log from among the plurality of task logs:
selecting a first portion of the first task log, wherein the first portion of the first task log comprises a text line or a paragraph;
for a first word in the first portion:
comparing the first word with each of a set of keywords, wherein the set of keywords included in a training dataset and are known to be among the confidential information, wherein comparing the first word with each of the set of keywords comprises:
extracting a first set of features from the first word, wherein the first set of features indicates a first identity of the first word, wherein the first set of features is represented by a first vector of numerical values;
extracting a second set of features from a second word of the set of keywords, wherein the second set of features indicates a second identity of the second word, wherein the second set of features is represented by a second vector of numerical values; and
comparing the first vector with the second vector;
determining that the first word is among the set of keywords, wherein determining that the first word is among the set of keywords comprises:
determining a percentage of numerical values in the first vector that correspond to counterpart numerical values in the second vector;
comparing the determined percentage of numerical values in the first vector that correspond to counterpart numerical values in the second vector to a threshold percentage;
determining that the determined percentage of numerical values exceeds the threshold percentage;
determining a hierarchical relationship between the first word and neighboring words in the first portion, wherein the hierarchical relationship between the first word and the neighboring words indicates whether or not the first word is associated with each of the neighboring words;
determining that the hierarchical relationship between the first word and the neighboring words indicates that the first word is associated with at least a third word in the first portion;
generating a template pattern comprising the first word and the at least third word, wherein the template pattern indicates that the first word and the at least third word are among the confidential information; and
obfuscating the first word and the at least third word.

9. The method of claim 8, wherein obfuscating the first word and the at least third word comprises encrypting the first word and the at least third word using an encryption technique.

10. The method of claim 8, further comprising:
using the template pattern to identify other instances of the template pattern in the plurality of task logs; and
obfuscating the identified instances of the template pattern; and
communicating the plurality of task logs with the obfuscated instances of the template pattern.

11. The method of claim 8, wherein:
each of the plurality of task logs has a different data format compared to other task logs; and
the different data format comprises structured data format, semi-structured data format, and unstructured data format.

12. The method of claim 8, wherein each of the plurality of task logs is compressed with a different compression technique compared to other task logs.

13. The method of claim 8, wherein the at least third word is included in the template pattern even if the at least third word is not among the set of keywords.

14. The method of claim 8, further comprising:
identifying a fourth word in the first portion, wherein the fourth word is a name of a user who is authorized to access the first word and the at least third word;
after obfuscating the first word and the at least third word, communicating the obfuscated first word and the at least third word to a computing device associated with the user;
receiving, from the computing device, a request to decrypt the obfuscated first word and the at least third word;
decrypting the obfuscated first word and the at least third word; and
communicating the decrypted first word and at least third word to the computing device.

15. A computer program comprising executable instructions stored in a non-transitory computer readable medium that when executed by a processor causes the processor to:
- access a plurality of task logs comprising text that is confidential information, wherein the confidential information comprises at least one of a port number, a database name, and a server name;
- for a first task log from among the plurality of task logs:
  - select a first portion of the first task log, wherein the first portion of the first task log comprises a text line or a paragraph;
  - for a first word in the first portion:
    - compare the first word with each of a set of keywords, wherein the set of keywords included in a training dataset and are known to be among the confidential information, wherein comparing the first word with each of the set of keywords comprises:
      - extracting a first set of features from the first word, wherein the first set of features indicates a first identity of the first word, wherein the first set of features is represented by a first vector of numerical values;
      - extracting a second set of features from a second word of the set of keywords, wherein the second set of features indicates a second identity of the second word, wherein the second set of features is represented by a second vector of numerical values; and
      - comparing the first vector with the second vector;
    - determine that the first word is among the set of keywords, wherein determining that the first word is among the set of keywords comprises:
      - determining a percentage of numerical values in the first vector that correspond to counterpart numerical values in the second vector;
      - comparing the determined percentage of numerical values in the first vector that correspond to counterpart numerical values in the second vector to a threshold percentage; and
      - determining that the determined percentage of numerical values exceeds the threshold percentage;
    - determine a hierarchical relationship between the first word and neighboring words in the first portion, wherein the hierarchical relationship between the first word and the neighboring words indicates whether or not the first word is associated with each of the neighboring words;
    - determine that the hierarchical relationship between the first word and the neighboring words indicates that the first word is associated with at least a third word in the first portion;
    - generate a template pattern comprising the first word and the at least third word, wherein the template pattern indicates that the first word and the at least third word are among the confidential information; and
    - obfuscate the first word and the at least third word.

16. The computer program of claim 15, wherein obfuscating the first word and the at least third word comprises encrypting the first word and the at least third word using an encryption technique.

17. The computer program of claim 15, wherein the instructions when executed by the processor, further cause the processor to:
- use the template pattern to identify other instances of the template pattern in the plurality of task logs; and
- obfuscate the identified instances of the template pattern; and
- communicate the plurality of task logs with the obfuscated instances of the template pattern.

18. The computer program of claim 15, wherein:
each of the plurality of task logs has a different data format compared to other task logs; and
the different data format comprises structured data format, semi-structured data format, and unstructured data format.

19. The computer program of claim 15, wherein each of the plurality of task logs is compressed with a different compression technique compared to other task logs.

20. The computer program of claim 15, wherein the at least third word is included in the template pattern even if the at least third word is not among the set of keywords.

* * * * *